(12) United States Patent
Kim et al.

(10) Patent No.: US 12,261,664 B2
(45) Date of Patent: Mar. 25, 2025

(54) METHOD AND APPARATUS FOR TRANSMITTING AND RECEIVING CHANNEL STATE INFORMATION IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 394 days.

(21) Appl. No.: 17/802,492

(22) PCT Filed: Feb. 25, 2021

(86) PCT No.: PCT/KR2021/002395
§ 371 (c)(1),
(2) Date: Aug. 25, 2022

(87) PCT Pub. No.: WO2021/172903
PCT Pub. Date: Sep. 2, 2021

(65) Prior Publication Data
US 2023/0141397 A1 May 11, 2023

(30) Foreign Application Priority Data
Feb. 25, 2020 (KR) .................. 10-2020-0022931

(51) Int. Cl.
H04B 7/06 (2006.01)
H04B 17/336 (2015.01)
H04W 16/28 (2009.01)

(52) U.S. Cl.
CPC ......... *H04B 7/0626* (2013.01); *H04B 7/0617* (2013.01); *H04B 17/336* (2015.01); *H04W 16/28* (2013.01)

(58) Field of Classification Search
CPC .. H04B 17/336; H04B 7/0617; H04B 7/0626; H04B 7/0632; H04B 7/0695; H04L 1/08;
(Continued)

(56) References Cited

U.S. PATENT DOCUMENTS 11,258,499 B2 * 2/2022 Park ................. H04B 7/0695
12,063,090 B2 * 8/2024 Go .................. H04B 7/0695
(Continued)

FOREIGN PATENT DOCUMENTS

KR 20190117704 10/2019

OTHER PUBLICATIONS

Huawei, HiSilicon, "CSI measurement enhancement for multi-TRP/panel transmission," 3GPP TSG-RAN WG1 Meeting #96, R1-1903100, Feb. 2019, 7 pages.
(Continued)

*Primary Examiner* — Robert J Lopata
(74) *Attorney, Agent, or Firm* — LEE, HONG, DEGERMAN, KANG & WAIMEY

(57) ABSTRACT

Disclosed are a method and apparatus for transmitting and receiving channel state information in a wireless communication system. A method for transmitting channel state information (CSI) according to an embodiment of the present disclosure may comprise the steps of: receiving configuration information related to the CSI from a base station; receiving one or more reference signal (RS) resources transmitted from the base station through different downlink spatial domain transmission filters; and transmitting, to the base station, the CSI including a layer 1 signal-to-interfer-
(Continued)

ence-plus-noise ratio (L1-SINR) generated on the basis of the one or more RS resources.

14 Claims, 17 Drawing Sheets

(58) Field of Classification Search
CPC ... H04L 1/1671; H04L 1/1822; H04L 1/1896; H04L 25/0224; H04L 27/261; H04L 27/26132; H04L 5/0094; H04W 16/28
USPC .......................................................... 370/329
See application file for complete search history.

(56) References Cited

U.S. PATENT DOCUMENTS

| | | | |
|---|---|---|---|
| 2020/0145068 A1* | 5/2020 | Chendamarai Kannan | H04L 5/0057 |
| 2020/0145866 A1* | 5/2020 | Onggosanusi | H04B 7/0617 |
| 2021/0152397 A1* | 5/2021 | Jiang | H04W 72/0446 |
| 2021/0175957 A1* | 6/2021 | Raghavan | H04B 7/0452 |
| 2021/0258898 A1* | 8/2021 | Ma | H04B 7/068 |
| 2021/0297135 A1* | 9/2021 | Kim | H04B 17/336 |
| 2021/0336670 A1* | 10/2021 | Taherzadeh Boroujeni | H04B 7/0626 |
| 2022/0104153 A1* | 3/2022 | Ko | H04L 5/00 |
| 2022/0286868 A1* | 9/2022 | Kim | H04L 1/0075 |
| 2022/0376856 A1* | 11/2022 | Li | H04L 5/0048 |
| 2022/0394504 A1* | 12/2022 | Guan | H04B 7/0691 |
| 2023/0056263 A1* | 2/2023 | Kim | H04L 5/0048 |
| 2023/0179381 A1* | 6/2023 | Rahman | H04L 5/0057 370/330 |
| 2024/0373422 A1* | 11/2024 | Alfarhan | H04W 72/1268 |

OTHER PUBLICATIONS

Samsung, "Issues on utilizing CSI-IM for interference measurement," 3GPP Tsg-Ran WG1 #100-e, e-Meeting, R1-2000636, Feb. 2020, 4 pages.

3rd Generation Partnership Project (3GPP), "Technical Specification Group Radio Access Network; NR; Physical layer procedures for data (Release 15)," 3GPP TS 38.214 V15.8.0, Jan. 2021, 107 pages.

LG Electronics, "Clarification of the maximum number of CSI-RS resources in resource setting," 3GPP TSG-RAN WG1 Meeting #100, e-Meeting, R1-2000683, Feb. 2020, 4 pages.

PCT International Application No. PCT/KR2021/002395, International Search Report dated Jun. 21, 2021, 4 pages.

* cited by examiner

METHOD AND APPARATUS FOR TRANSMITTING AND RECEIVING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2021/002395, filed on Feb. 25, 2021, which claims the benefit of earlier filing date and right of priority to Korean Application No. 10-2020-0022931, filed on Feb. 25, 2020, the contents of which are all incorporated by reference herein in their entirety.

TECHNICAL FIELD

The present disclosure relates to a wireless communication system, and in more detail, relates to a method and an apparatus of transmitting and receiving channel state information in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus of transmitting and receiving channel state information.

In addition, an additional technical object of the present disclosure is to provide a method and an apparatus of beam management when transmitting and receiving a channel/a signal between a terminal and multiple TRPs (transmission reception point).

The technical objects to be achieved by the present disclosure are not limited to the above-described technical objects, and other technical objects which are not described herein will be clearly understood by those skilled in the pertinent art from the following description.

Technical Solution

A method of transmitting CSI (channel state information) in a wireless communication system according to an aspect of the present disclosure may include receiving, from a base station, configuration information related to the CSI; receiving, from the base station, one or more RS (reference signal) resources transmitted by a different downlink spatial domain transmission filter; and transmitting, to the base station, the CSI including a L1-SINR (Layer 1 Signal-to-Interference-plus-Noise Ratio) generated based on the one or more RS resources. The configuration information may include information on M (M is a natural number) RS resource groups, each of the M RS resource groups may include one or more RS resource pairs configured with a RS resource for channel measurement and a RS resource for interference measurement and the CSI may include information on N (N≤M, N is a natural number) RS resource groups selected from the M RS resource groups and a L1-SINR value for the N RS resource groups.

A terminal transmitting CSI (channel state information) in a wireless communication system according to an additional aspect of the present disclosure may include one or more transceivers for transmitting and receiving a wireless signal; and one or more processors controlling the one or more transceivers. The one or more processors may be configured to receive, from a base station, configuration information related to the CSI; receive, from the base station, one or more RS (reference signal) resources transmitted by a different downlink spatial domain transmission filter; and transmit, to the base station, the CSI including a L1-SINR (Layer 1 Signal-to-Interference-plus-Noise Ratio) generated based on the one or more RS resources. The configuration information may include information on M (M is a natural number) RS resource groups, each of the M RS resource groups may include one or more RS resource pairs configured with a RS resource for channel measurement and a RS resource for interference measurement and the CSI may include information on N (N≤M, N is a natural number) RS resource groups selected from the M RS resource groups and a L1-SINR value for the N RS resource groups.

One or more non-transitory computer readable media storing one or more commands according to an additional aspect of the present disclosure may control a device which transmits CSI (channel state information) in a wireless communication system to receive, from a base station, configuration information related to the CSI; receive, from the base station, one or more RS (reference signal) resources transmitted by a different downlink spatial domain transmission filter; and transmit to the base station the CSI including a L1-SINR (Layer 1 Signal-to-Interference-plus-Noise Ratio) generated based on the one or more RS resources. The configuration information may include information on M (M is a natural number) RS resource groups, each of the M RS resource groups may include one or more RS resource pairs configured with a RS resource for channel measurement and a RS resource for interference measurement and the CSI may include information on N (N≤M, N is a natural number) RS resource groups selected from the M RS resource groups and a L1-SINR value for the N RS resource groups.

A processing device configured to control a terminal to transmit CSI (channel state information) in a wireless communication system may include one or more processors; and one or more computer memories which are operably connected to the one or more processors and store instructions which perform operations based on being executed by the one or more processors. The operations may include receiving, from a base station, configuration information related to the CSI; receiving, from the base station, one or more RS (reference signal) resources transmitted by a different downlink spatial domain transmission filter; and transmitting, to the base station, the CSI including a L1-SINR (Layer 1 Signal-to-Interference-plus-Noise Ratio) generated based on the one or more RS resources. The configuration information may include information on M (M is a natural number) RS resource groups, each of the M RS resource groups may include one or more RS resource pairs configured with a RS resource for channel measurement and a RS resource for interference measurement and the CSI may include information on N (N≤M, N is a natural number) RS resource groups selected from the M RS resource groups and a L1-SINR value for the N RS resource groups.

A method of receiving CSI (channel state information) in a wireless communication system may include transmitting, to a terminal, configuration information related to the CSI; transmitting, to the terminal, one or more RS (reference signal) resources by a different downlink spatial domain transmission filter; and receiving, from the terminal, the CSI. The configuration information may include information on M (M is a natural number) RS resource groups, each of the M RS resource groups may include one or more RS resource pairs configured with a RS resource for channel measurement and a RS resource for interference measurement and the CSI may include information on N (N≤M, N is a natural number) RS resource groups selected from the M RS resource groups and a L1-SINR value for the N RS resource groups.

A base station transmitting CSI (channel state information) in a wireless communication system may include one or more transceivers for transmitting and receiving a wireless signal; and one or more processors controlling the one or more transceivers. The one or more processors may be configured to transmit, to a terminal, configuration information related to the CSI; transmit, to the terminal, one or more RS (reference signal) resources by a different downlink spatial domain transmission filter; and receive, the terminal, the CSI from. The configuration information may include information on M (M is a natural number) RS resource groups, each of the M RS resource groups may include one or more RS resource pairs configured with a RS resource for channel measurement and a RS resource for interference measurement and the CSI may include information on N (N≤M, N is a natural number) RS resource groups selected from the M RS resource groups and a L1-SINR value for the N RS resource groups.

Advantageous Effects

According to an embodiment of the present disclosure, an optimal beam may be selected in multiple TRP transmission operations as channel state information that cross beam interference from multiple TRPs is reflected is reported.

In addition, according to an embodiment of the present disclosure, a signaling overhead may be reduced when channel state information based on a beam transmitted from multiple TRPs is reported.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
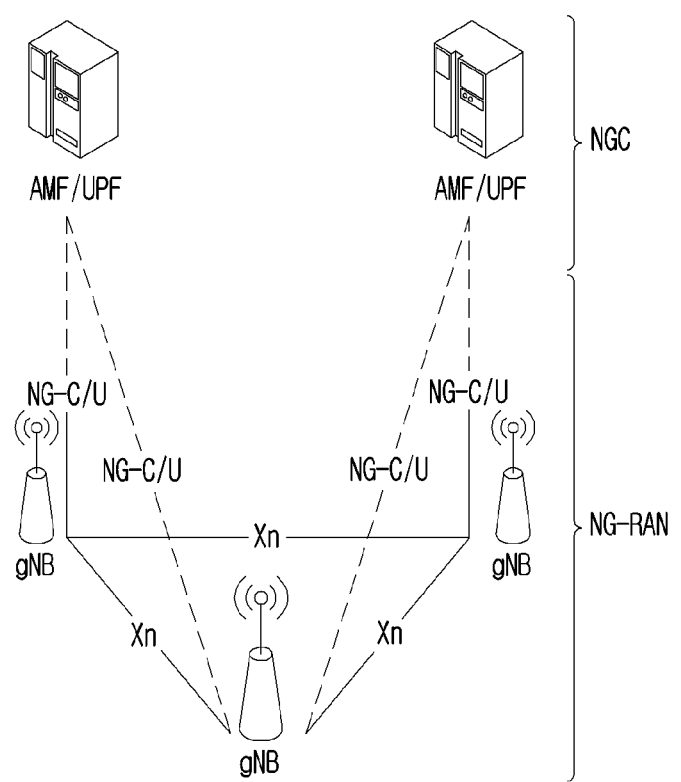
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
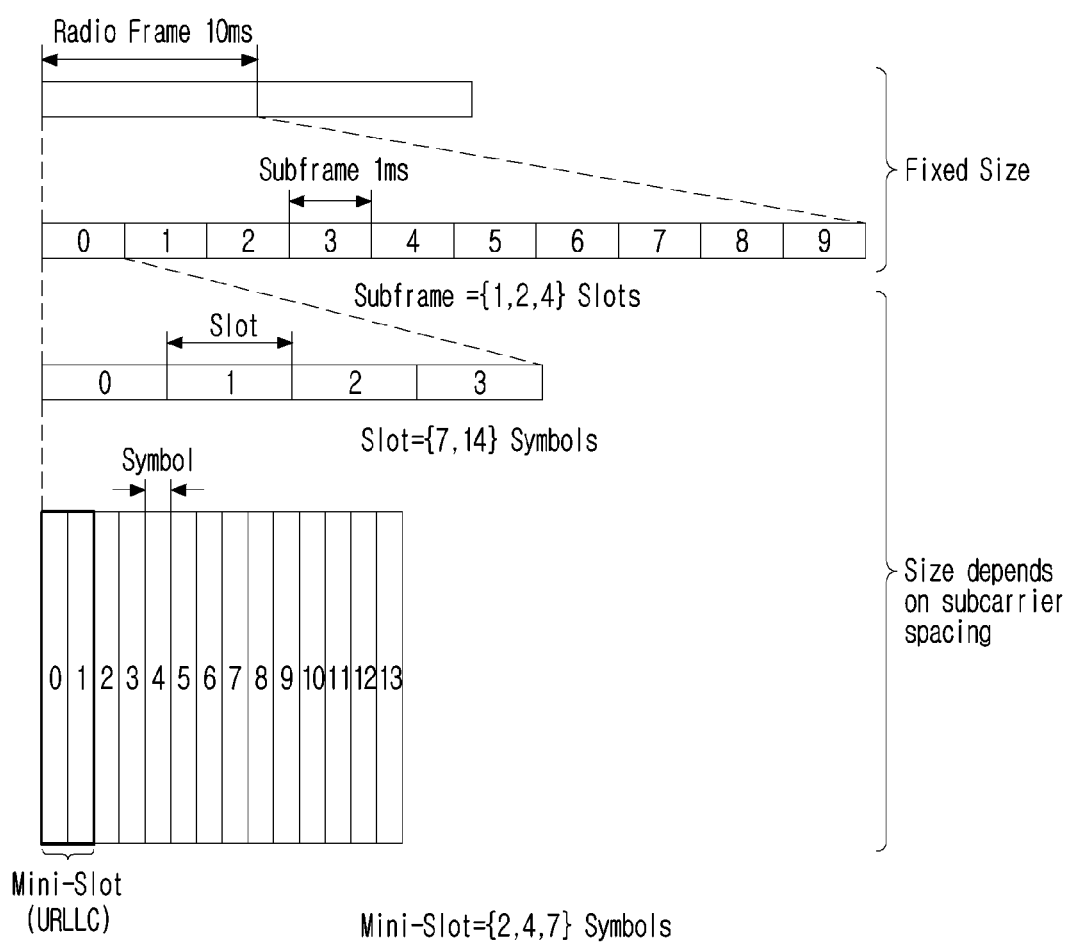
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max}N_f/100) \cdot T_c=10$ ms. Here, a radio frame is configured with 10 subframes having a duration of $T_{sf}=(\Delta f_{max}N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu, \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
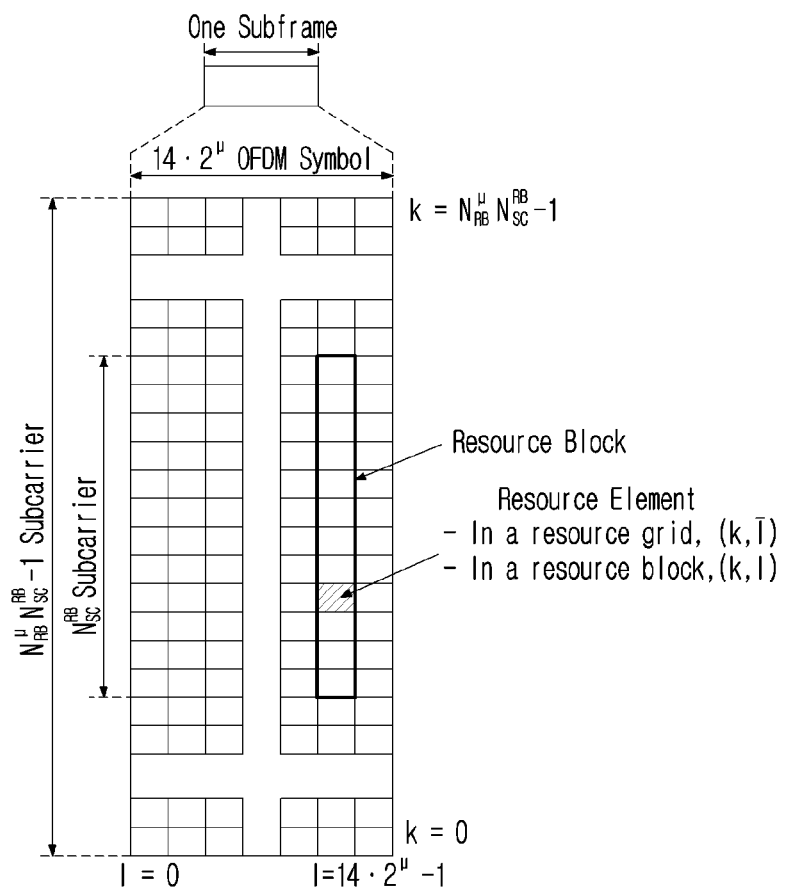
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with 14·2μ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k, l'). Here, $k=0, \ldots, N_{RB}^\mu N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k, l) is used. Here, $l=0, \ldots, N_{symb}^\mu-1$. A resource element (k, l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration p is identical to 'point A'. A relationship between a common resource block number $n_{CRB}^\mu$ and a resource element (k, l) for a subcarrier spacing configuration p in a frequency domain is given as in the following Equation 1.

$$n_{CRB}^\mu = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^\mu = n_{PRB}^\mu + N_{BWP,i}^{start,\mu} \quad \text{[Equation 2]}$$

$N_{BWP,i}^{start,\mu}$ is a common resource block that a BWP starts relatively to common resource block 0.

Figure 4:
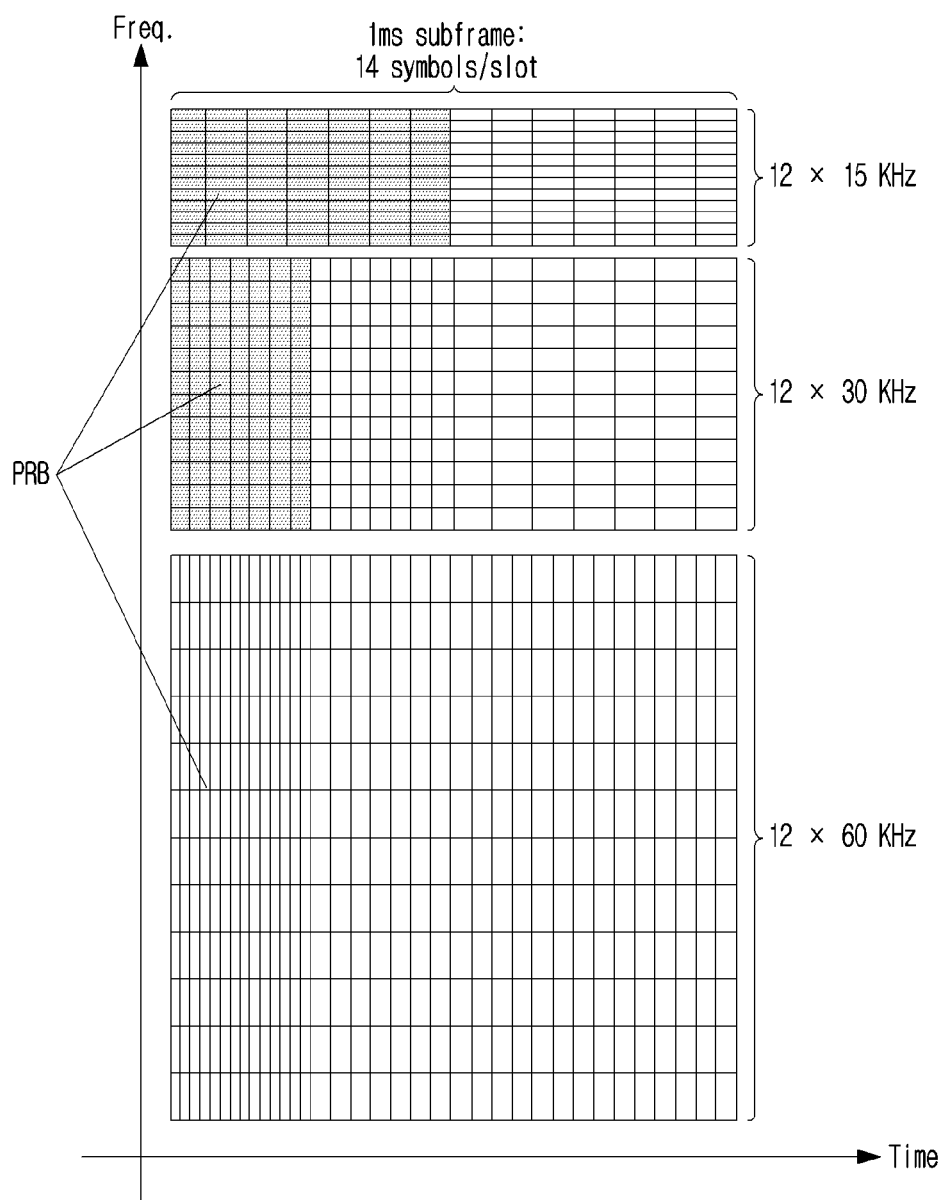
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
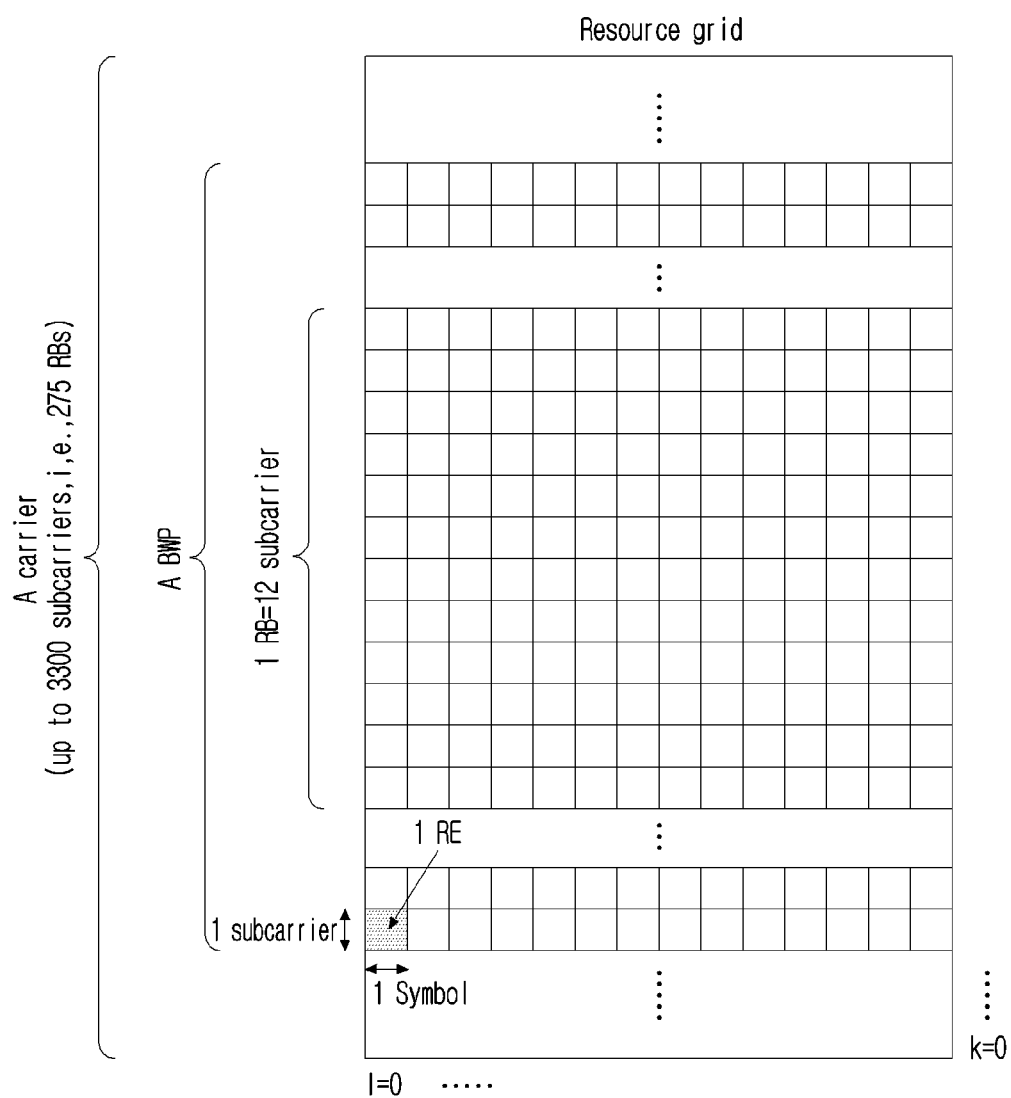
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
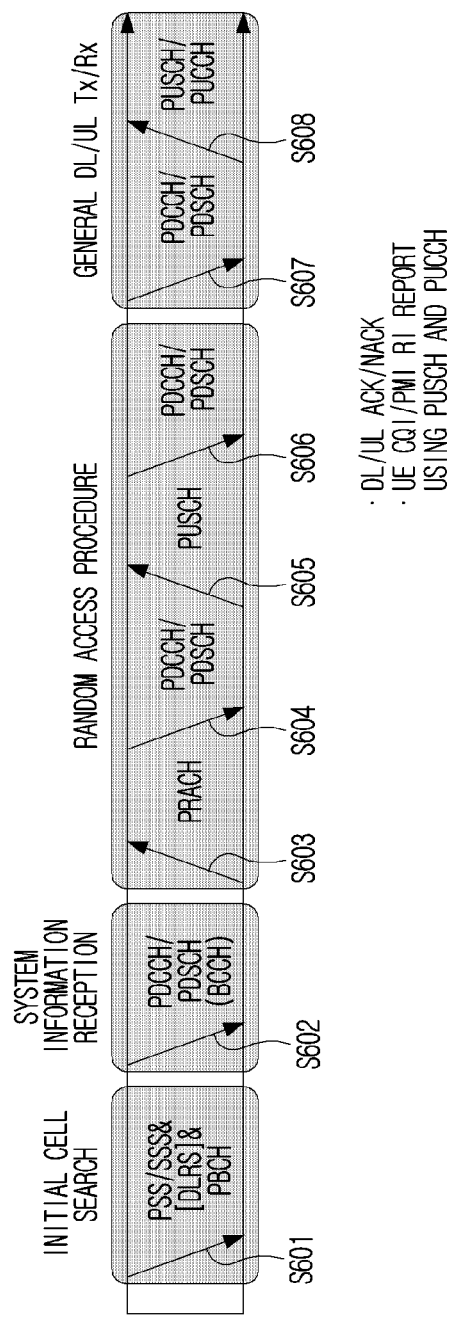
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple |

TABLE 5-continued

| DCI Format | Use |
| --- | --- |
| | PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Beam Management (BM)

As a BM procedure is L1 (layer 1)/L2 (layer 2) procedures for acquiring and maintaining a set of base station (e.g., gNB, TRP, etc.) and/or terminal (e.g., UE) beams which may be used to transmit/receive a downlink (DL) and an uplink (UL), it may include the following procedures and terms.

Beam measurement: An operation that a base station or UE measures a property of a received beamforming signal Beam determination: An operation that a base station or UE selects its Tx beam/Rx beam Beam sweeping: An operation of covering a spatial domain by using a Tx and/or Rx beam during a certain time interval in a predetermined manner Beam report: An operation that UE reports information of a beamformed signal based on beam measurement In addition, each BM procedure may include Tx beam sweeping for determining a Tx Beam and Rx beam sweeping for determining a Rx beam.

Hereinafter, a DL BM procedure is described.

A DL BM procedure may include (1) transmission for beamformed DL RSs (reference signal) of a base station (e.g., a CSI-RS or a SS Block (SSB)) and (2) beam reporting of a terminal.

Here, beam reporting may include preferred DL RS ID (identifier) (s) and L1-RSRP (Reference Signal Received Power) corresponding to it.

The DL RS ID may be an SSBRI (SSB Resource Indicator) or a CRI (CSI-RS Resource Indicator).

Hereinafter, a DL BM procedure using an SSB is described.

Figure 7:
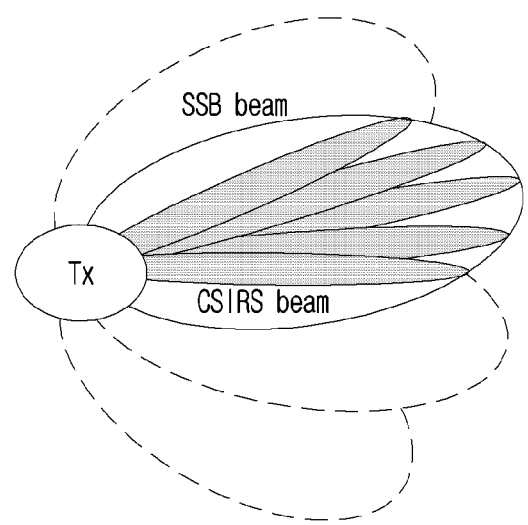
FIG. 7 is a diagram which illustrates a downlink beam management operation in a wireless communication system to which the present disclosure may be applied.

FIG. 7 is a diagram which illustrates a downlink beam management operation in a wireless communication system to which the present disclosure may be applied.

In reference to FIG. 7, an SSB beam and a CSI-RS beam may be used for beam measurement. A measurement metric is L1-RSRP per resource/block. An SSB may be used for coarse beam measurement and a CSI-RS may be used for fine beam measurement. An SSB may be used for both Tx beam sweeping and Rx beam sweeping.

Rx beam sweeping using an SSB may be performed while UE changes an Rx beam for the same SSBRI across multiple SSB bursts. Here, one SS burst includes one or more SSBs and one SS burst set includes one or more SSB bursts.

Figure 8:
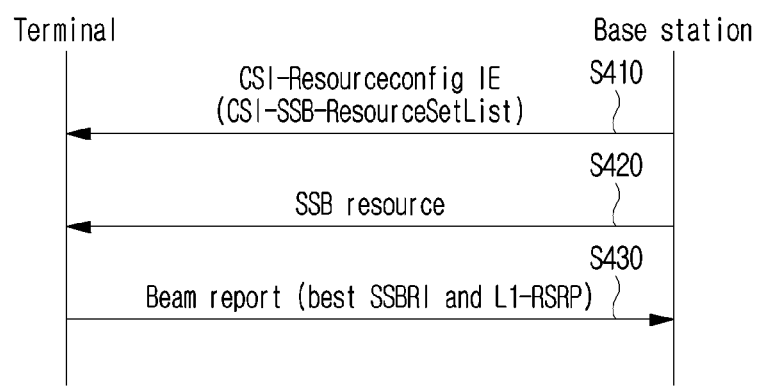
FIG. 8 is a diagram which illustrates a downlink beam management procedure using an SSB in a wireless communication system to which the present disclosure may be applied.

FIG. 8 is a diagram which illustrates a downlink beam management procedure using an SSB in a wireless communication system to which the present disclosure may be applied.

A configuration on beam report using an SSB is performed in a CSI/beam configuration in a RRC connected state (or a RRC connected mode).

In reference to FIG. 8, a terminal receives CSI-ResourceConfig IE including CSI-SSB-ResourceSetList including SSB resources used for BM from a base station S410.

Table 6 represents an example of CSI-ResourceConfig IE and as in Table 6, a BM configuration using an SSB configures an SSB like a CSI-RS resource without being separately defined.

TABLE 6

```
-- ASN1START
-- TAG-CSI-RESOURCECONFIG-START
    CSI-ResourceConfig ::=              SEQUENCE {
        csi-ResourceConfigId            CSI-ResourceConfigId,
        csi-RS-ResourceSetList          CHOICE {
            nzp-CSI-RS-SSB              SEQUENCE {
                nzp-CSI-RS-ResourceSetList              SEQUENCE (SIZE (1..maxNrofNZP-CSI-RS-
ResourceSetsPerConfig)) OF NZP-CSI-RS-ResourceSetId     OPTIONAL,
                csi-SSB-ResourceSetList                 SEQUENCE (SIZE (1..maxNrofCSI-SSB-
ResourceSetsPerConfig)) OF CSI-SSB-ResourceSetId        OPTIONAL
            },
            csi-IM-ResourceSetList          SEQUENCE (SIZE (1..maxNrofCSI-IM-
ResourceSetsPerConfig)) OF CSI-IM-ResourceSetId
        },
        bwp-Id                          BWP-Id,
        resourceType                    ENUMERATED { aperiodic, semiPersistent,
periodic },
        ...
    }
-- TAG-CSI-RESOURCECONFIGTOADDMOD-STOP
-- ASN1STOP
```

In Table 6, a csi-SSB-ResourceSetList parameter represents a list of SSB resources used for beam management and reporting in one resource set. Here, an SSB resource set may be configured as {SSBx1, SSBx2, SSBx3, SSBx4, ... }. An SSB index may be defined as 0 to 63. A terminal receives an SSB resource from the base station based on the CSI-SSB-ResourceSetList S420.

When CSI-RS reportConfig related to report on SSBRI and L1-RSRP is configured, the terminal (beam) reports the best SSBRI and L1-RSRP corresponding to it to a base station S430.

Hereinafter, a DL BM procedure using a CSI-RS is described.

When usage of a CSI-RS is described, a CSI-RS is used for beam management i) when a repetition parameter is configured for a specific CSI-RS resource set and TRS info is not configured. ii) When a repetition parameter is not configured and TRS info is configured, a CSI-RS is used for a TRS (tracking reference signal). iii) When a repetition parameter is not configured and TRS info is not configured, a CSI-RS is used for CSI acquisition.

Such a repetition parameter may be configured only for CSI-RS resource sets connected with CSI-ReportConfig having report of 'No Report (or None)' or L1 RSRP.

If a terminal is configured with CSI-ReportConfig that reportQuantity is configured as 'cri-RSRP' or 'none' and CSI-ResourceConfig (a higher layer parameter resources-ForChannelMeasurement) for channel measurement includes NZP-CSI-RS-ResourceSet that a higher layer parameter 'repetition' is configured without including a higher layer parameter 'trs-Info', the terminal may be configured only with ports with the same number (1-port or 2-port) having a higher layer parameter 'nrofPorts' for all CSI-RS resources in NZP-CSI-RS-ResourceSet.

When (a higher layer parameter) repetition is configured as 'ON', it is related to a Rx beam sweeping procedure of a terminal. In this case, when a terminal is configured with NZP-CSI-RS-ResourceSet, the terminal may assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted to a different OFDM symbol. In addition, a terminal does not expect to receive a different periodicity for periodicityAndOffset in all CSI-RS resources within NZP-CSI-RS-Resourceset.

On the other hand, when repetition is configured as 'OFF', it is related to a Tx beam sweeping procedure of a base station. In this case, when repetition is configured as 'OFF', a terminal does not assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through a different Tx beam.

In other words, when reportQuantity of the CSI-RS reportConfig IE is configured as 'ssb-Index-RSRP', a terminal reports the best SSBRI and L1-RSRP corresponding to it to a base station.

And, when a CSI-RS resource is configured in the same OFDM symbol(s) as an SSB (an SS/PBCH Block) and 'QCL-TypeD' may be applied, the terminal may assume that a CSI-RS and an SSB are quasi co-located from a viewpoint of 'QCL-TypeD'.

Here, the QCL TypeD may mean that antenna ports are QCL-ed from a viewpoint of a spatial Rx parameter. When a terminal receives a plurality of DL antenna ports in a QCL Type D relationship, the same Rx beam may be applied. In addition, a terminal does not expect that a CSI-RS will be configured in a RE overlapped with an RE of an SSB.

Figure 9:
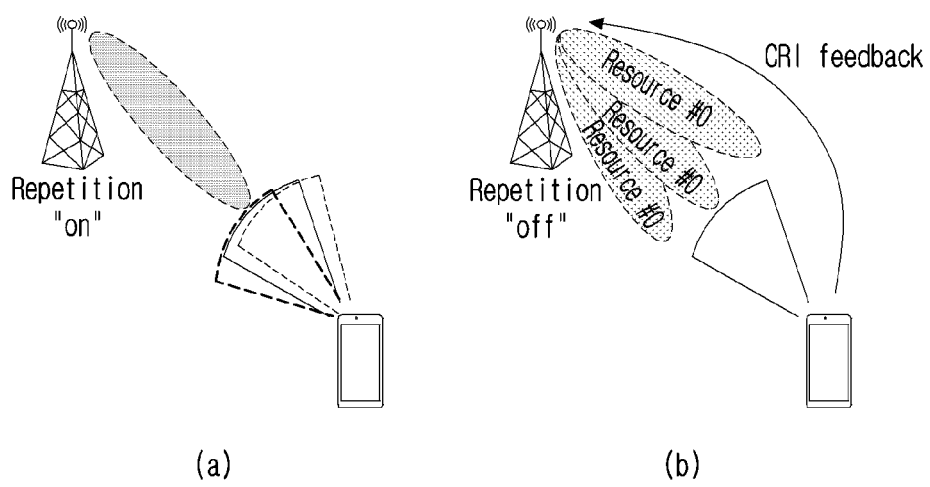
FIG. 9 is a diagram which illustrates a downlink beam management operation using a CSI-RS in a wireless communication system to which the present disclosure may be applied.

FIG. 9 is a diagram which illustrates a downlink beam management operation using a CSI-RS in a wireless communication system to which the present disclosure may be applied.

FIG. 9(a) represents a Rx beam determination (or refinement) procedure of a terminal and FIG. 9(b) represents a Tx beam sweeping procedure of a base station. In addition, FIG. 9(a) is a case in which a repetition parameter is configured as 'ON' and FIG. 9(b) is a case in which a repetition parameter is configured as 'OFF'.

Figure 10:
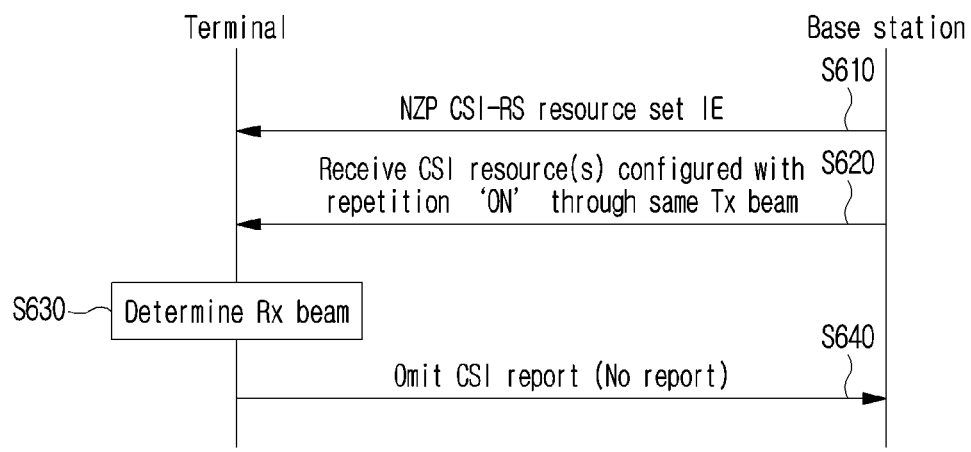
FIG. 10 is a diagram which illustrates an Rx beam determination process of a terminal in a wireless communication system to which the present disclosure may be applied.

FIG. 10 is a diagram which illustrates a Rx beam determination process of a terminal in a wireless communication system to which the present disclosure may be applied.

In reference to FIG. 9(a) and FIG. 10, a Rx beam determination process of a terminal is described.

A terminal receives a NZP CSI-RS resource set IE including a higher layer parameter repetition from a base station through RRC signaling S610. Here, the repetition parameter is configured as 'ON'.

A terminal repetitively receives resource(s) in a CSI-RS resource set configured as repetition 'ON' through the same Tx beam (or DL spatial domain transmission filter) of a base station in a different OFDM symbol S620.

A terminal determines its Rx beam S630.

A terminal omits CSI reporting S640. In this case, reportQuantity of a CSI reporting configuration may be configured as 'No report (or None).

In other words, the terminal may omit CSI reporting when it is configured as repetition 'ON'.

Figure 11:
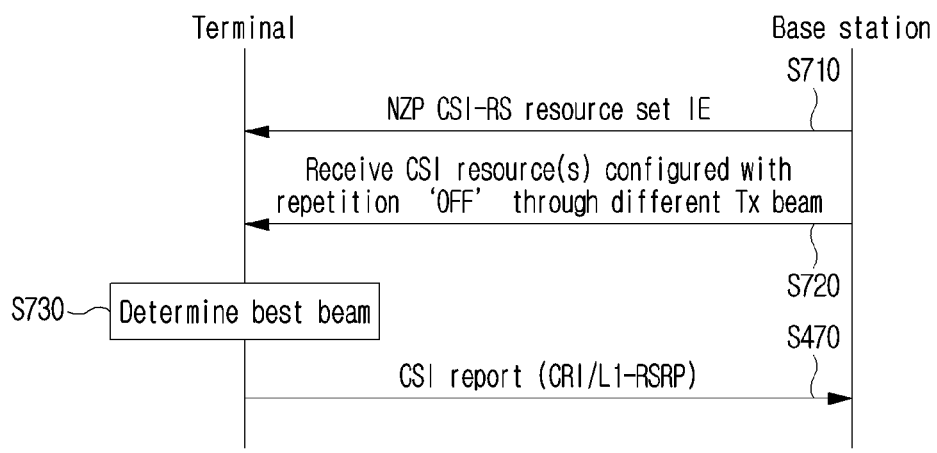
FIG. 11 is a diagram which illustrates a Tx beam determination process of a base station in a wireless communication system to which the present disclosure may be applied.

FIG. 11 is a diagram which illustrates a Tx beam determination process of a base station in a wireless communication system to which the present disclosure may be applied.

In reference to FIG. 9(b) and FIG. 11, a Tx beam determination process of a base station is described.

A terminal receives a NZP CSI-RS resource set IE including a higher layer parameter repetition from a base station through RRC signaling S710. Here, the repetition parameter is configured as 'OFF' and is related to a Tx beam sweeping procedure of a base station.

A terminal receives resource(s) in a CSI-RS resource set configured as repetition 'OFF' through a different Tx beam (DL spatial domain transmission filter) of a base station S720.

A terminal selects (or determines) the best beam S740.

A terminal reports an ID on a selected beam and relative quality information (e.g., L1-RSRP) to a base station S740. In this case, reportQuantity of a CSI reporting configuration may be configured as 'a CRI+L1-RSRP'.

In other words, when a CSI-RS is transmitted for BM, the terminal reports a CRI and L1-RSRP regarding it to a base station.

Figure 12:
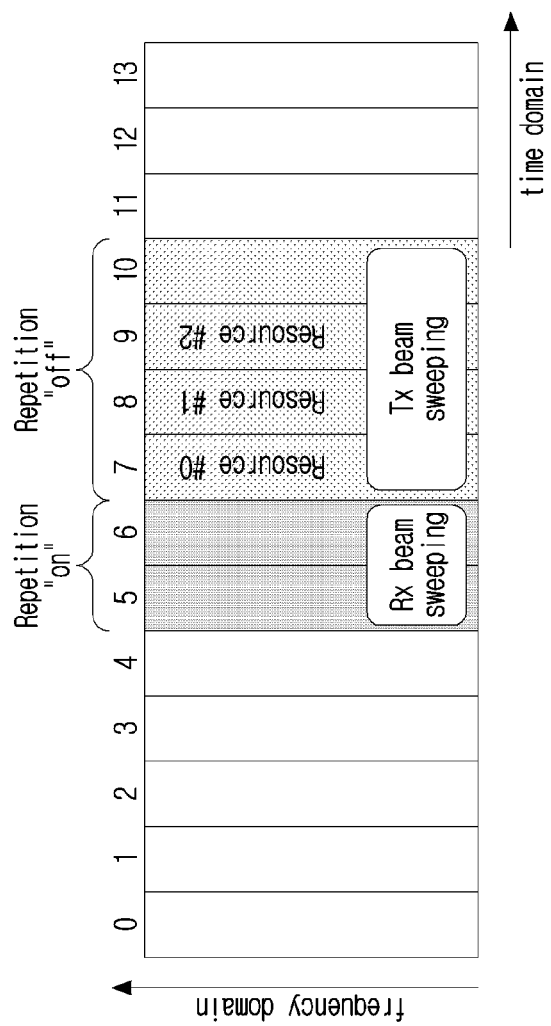
FIG. 12 is a diagram which illustrates resource allocation in a time and frequency domain related to a downlink beam management operation in a wireless communication system to which the present disclosure may be applied.

FIG. 12 is a diagram which illustrates resource allocation in a time and frequency domain related to a downlink beam management operation in a wireless communication system to which the present disclosure may be applied.

In reference to FIG. 12, it may be seen that when repetition 'ON' is configured in a CSI-RS resource set, a plurality of CSI-RS resources are repetitively used by applying the same Tx beam and when repetition 'OFF' is configured in a CSI-RS resource set, different CSI-RS resources are transmitted by a different Tx beam.

Hereinafter, a downlink BM related beam indication method is described.

A terminal may receive a RRC configuration for a list on up to M candidate transmission configuration indication (TCI) states at least for a purpose of a QCL (Quasi Co-location) indication. Here, M may be 64.

Each TCI state may be configured as one RS set. Each ID of a DL RS for a spatial QCL purpose (QCL Type D) at least in a RS set may refer to one of DL RS types such as an SSB, a P (periodic)-CSI RS, a SP (semi-persistent)-CSI RS, an a (aperiodic)-CSI RS, etc.

An ID of DL RS(s) in a RS set used at least for a spatial QCL purpose may be initialized/updated at least through explicit signaling.

Table 7 illustrates a TCI-State information element (IE).

A TCI-State IE is associated with a quasi co-location (QCL) type corresponding to one or two DL reference signals (RS).

TABLE 7

```
-- ASN1START
-- TAG-TCI-STATE-START
TCI-State ::=      SEQUENCE {
    tci-StateId        TCI-StateId,
    qcl-Type1          QCL-Info,
```

TABLE 7-continued

```
    qcl-Type2          QCL-Info
        OPTIONAL,   -- Need R
    ...
}
QCL-Info ::=       SEQUENCE {
    cell                               ServCellIndex
        OPTIONAL,   -- Need R
    bwp-Id                             BWP-Id
        OPTIONAL,   -- Cond CSI-RS-Indicated
    referenceSignal    CHOICE {
        csi-rs                         NZP-CSI-RS-ResourceId,
        ssb                            SSB-Index
    },
    qcl-Type           ENUMERATED {typeA, typeB, typeC, typeD},
    ...
}
-- TAG-TCI-STATE-STOP
-- ASN1STOP
```

In Table 7, a bwp-Id parameter represents a DL BWP (bandwidth part) where a RS is positioned, a cell parameter represents a carrier where a RS is positioned and a referencesignal parameter represents reference antenna port(s) which become a source of a quasi co-location for corresponding target antenna port(s) or a reference signal including it. The target antenna port(s) may be a CSI-RS, a PDCCH DMRS, or a PDSCH DMRS. In an example, a corresponding TCI state ID (identifier) may be indicated to NZP CSI-RS resource configuration information to indicate QCL reference RS information for a NZP (non-zero power) CSI-RS. In another example, a TCI state ID may be indicated to each CORESET configuration to indicate QCL reference information for PDCCH DMRS antenna port(s). In another example, a TCI state ID may be indicated through DCI to indicate QCL reference information for PDSCH DMRS antenna port(s).

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI-based non-coherent joint transmission (NCJT)/single DCI-based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information from DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 13:
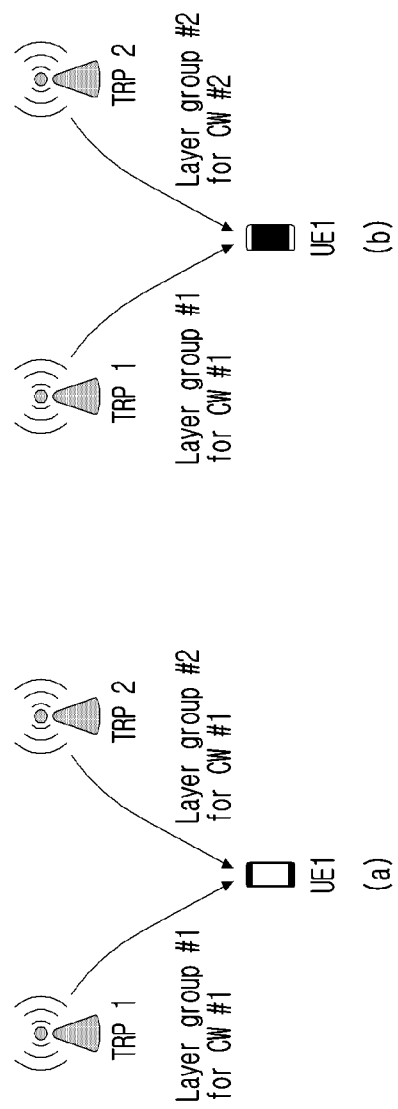
FIG. 13 illustrates a method of transmitting multiple TRPs in a wireless communication system to which the present disclosure may be applied.

FIG. 13 illustrates a method of multiple TRPs transmission in a wireless communication system to which the present disclosure may be applied.

In reference to FIG. 13(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 13(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 13(b), it may have a disadvantage that a code rate corresponding to a TB is higher compared to FIG. 13(a). However, it has an advantage that it may adjust a code rate by indicating a different RV (redundancy version) value or may adjust a modulation order of each CW for encoded bits generated from the same TB according to a channel environment.

According to methods illustrated in FIG. 13(a) and FIG. 13(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Hereinafter, MTRP URLLC is described.

In the present disclosure, DL MTRP URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. A UE configured with a DL MTRP-URLLC transmission method receives the same data/DCI by using a different layer/time/frequency resource. In this case, a UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. A UE may achieve high reliability because it receives the same data/DCI through resource 1 and resource 2. Such DL MTRP URLLC may be applied to a PDSCH/a PDCCH.

And, in the present disclosure, UL MTRP-URLLC means that multiple TRPs receive the same data/UCI (uplink control information) from any UE by using a different layer/time/frequency resource. For example, TRP 1 receives the same data/DCI from a UE in resource 1 and TRP 2 receives the same data/DCI from a UE in resource 2 and shares received data/DCI through a backhaul link connected between TRPs. A UE configured with a UL MTRP-URLLC transmission method transmits the same data/UCI by using a different layer/time/frequency resource. In this case, a UE is configured from a base station for which Tx beam and which Tx power (i.e., UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 may be configured. Such UL MTRP URLLC may be applied to a PUSCH/a PUCCH.

In addition, in the present disclosure, when a specific TCI state (or TCI) is used (or mapped) in receiving data/DCI/UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and/or power indicated by a corresponding TCI state in that frequency/time/space resource.

Here, an UL TCI state includes Tx beam and/or Tx power information of a UE and spatial relation information, etc. instead of a TCI state may be configured to a UE through other parameter. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for open loop parameter Po and alpha (up to 32 parameter value sets per cell), q_d: an index of a DL RS resource for PL (pathloss) measurement (up to 4 measurement per cell), l: a closed loop power control process index (up to 2 processes per cell)).

Hereinafter, MTRP eMBB is described.

In the present disclosure, MTRP-eMBB means that multiple TRPs transmit different data (e.g., a different TB) by using a different layer/time/frequency. A UE configured with a MTRP-eMBB transmission method receives an indication on multiple TCI states through DCI and assumes that data received by using a QCL RS of each TCI state is different data.

Meanwhile, whether of MTRP URLLC transmission/reception or MTRP eMBB transmission/reception may be understood by a UE by separately dividing a RNTI for MTRP-URLLC and a RNTI for MTRP-eMBB and using them. In other words, when CRC masking of DCI is performed by using a RNTI for URLLC, a UE is considered as URLLC transmission and when CRC masking of DCI is performed by using a RNTI for eMBB, a UE is considered as eMBB transmission. Alternatively, a base station may configure MTRP URLLC transmission/reception or may configure TRP eMBB transmission/reception to a UE through other new signaling.

In a description of the present disclosure, for convenience of a description, it is described by assuming cooperative transmission/reception between 2 TRPs, but a method proposed in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to a UE. Accordingly, when a UE receives/transmits data/DCI/UCI by using TCI state 1, it means that it receives/transmits data/DCI/UCI from/to TRP 1.

A Beam Reporting Method for Multiple TRPs (MTRP)

The present disclosure proposes a method for transmitting/receiving the same DCI/data transport block (TB)/UCI when transmitting and receiving a signal and/or a channel by a TDM/FDM/SDM method between MTRPs and a UE (User Equipment).

In order to receive a MTRP PDSCH, a UE may have 2 Rx panels which may simultaneously receive two beams. For example, a UE receives data 1 transmitted from TRP 1 by using panel/beam 1 and at the same time, receives data 2 transmitted from TRP 2 by using panel/beam 2. Here, data 1 may be effectively received only when a beam of TRP 1 received in panel 1 has high reception strength and a beam of TRP 2 has low reception strength. Similarly, data 2 may be effectively received only when a beam of TRP 2 received in panel 2 has high reception strength and a beam of TRP 1 has low reception strength.

A UE may report to a base station reception strength information on one or more candidate beams of TRP 1 and one or more candidate beams of TRP 2. It is referred to as beam reporting. And, a base station may perform MTRP PDSCH transmission by selecting a beam of TRP 1 and a beam of TRP 2 based on received beam reporting. For example, it is assumed that a beam candidate which may be transmitted by TRP 1 (i.e., a transmission BM (beam management)-RS of TRP 1) is NZP CSI-RS 1, 2 (1 port, respectively) and a beam candidate which may be transmitted by TRP 2 (i.e., a transmission BM-RS of TRP 2) is NZP CSI-RS 3, 4 (1 port, respectively). In this case, which combination of two beam candidates of TRP 1 corresponding to NZP CSI-RS 1, 2 and two beam candidates of TRP 2 corresponding to NZP CSI-RS 3, 4 will be effective to MTRP PDSCH transmission may be determined by a base station. For it, a UE may perform Layer 1 Signal-to-Interference-plus-Noise Ratio (L1-SINR) beam reporting using NZP CSI-RS 1, 2, 3, 4.

A UE may perform beam reporting as follows so that a base station can effectively configure a beam of TRP 1 and a beam of TRP 2.

L1-SINR beam reporting configured for a UE may be configured as follows. All (CMR (channel measurement resource), IMR (interference measurement resource)) pair combinations for beam candidates (e.g., a BM-RS, a NZP CSI-RS, an SSB, etc.) may be configured. For example, in L1-SINR calculation, for channel measurement, a terminal may be configured with NZP CSI-RS resource(s) and/or SSB resource(s) and for interference measurement, a terminal may be configured with NZP CSI-RS resource(s) or CSI-IM resource(s).

Hereinafter, for convenience of a description, a case in which NZP CSI-RS 1/2/3/4 are a beam candidate for MTRP transmission is assumed. But, such an assumption does not limit a technical scope of the present disclosure.

In this case, all possible (CMR, IMR) combinations are as follows.

(CMR, IMR)={(NZP CSI-RS 1, NZP CSI-RS 3), (NZP CSI-RS 1, NZP CSI-RS 4), (NZP CSI-RS 2, NZP CSI-RS 3), (NZP CSI-RS 2, NZP CSI-RS 4), (NZP CSI-RS 3, NZP CSI-RS 1), (NZP CSI-RS 3, NZP CSI-RS 2), (NZP CSI-RS 4, NZP CSI-RS 1), (NZP CSI-RS 4, NZP CSI-RS 2)}

A UE may be configured to perform L1-SINR reporting for the 8 (CMR, IMR) pairs. And, a UE may report 8 L1-SINR values corresponding to each CMR, IMR pair. A base station which is reported a L1-SINR value may find pair i, j with $\text{argmax}_{ij}(\text{L1-SINR}_{ij}+\text{L1-SINR}_{ji})$. In other words, a base station may find pair i, j that $\text{L1-SINR}_{ij}+\text{L1-SINR}_{ji}$ becomes the maximum value. Here, $\text{L1-SINR}_{ij}$ means a SINR measured with (CMR, IMR)=(NZP CSI-RS i, NZP CSI-RS j). In other words, $\text{L1-SINR}_{ij}$ means a ratio of measurement power of NZP CSI-RS j resource (i.e., interference and noise) to measurement power of NZP CSI-RS i resource (i.e., a desired signal).

Alternatively, a base station may find i, j with $\text{argmax}_{ij}$ (tput ($\text{L1-SINR}_{ij}$)+tput ($\text{L1-SINR}_{ji}$)). In other words, a base station may find pair i, j that tput ($\text{L1-SINR}_{ij}$)+tput (L1-

$SINR_{ji})$ becomes the maximum value. Here, tput (L1-SINR) means a transmittable throughput for a L1-SINR and for example, it may mean log(1+L1-SINR).

Alternatively, i, j were found by a simple sum of L1-SINRs or tputs in the Equation, but differently from it, i, j which maximize the minimum value of $L1\text{-}SINR_{ij}$ and $L1\text{-}SINR_{ji}$ may be found. In addition, i, j which maximize the minimum value of tput ($L1\text{-}SINR_{ij}$) and tput ($L1\text{-}SINR_{ji}$)) may be found.

But, as described above, a method that a UE reports a L1-SINR for all possible (CMR, IMR) combinations has a disadvantage that a beam reporting overhead is large.

Hereinafter, in a description, for convenience of a description, a case is assumed in which NZP CSI-RS 1/2/3/4 are a beam candidate for MTRP transmission (e.g., a BM-RS, a NZP CSI-RS, an SSB). But, such an assumption does not limit a technical scope of the present disclosure.

Proposal 1)

L1-SINR beam reporting configured for a UE may be configured as follows. A NZP CSI-RS for a specific TRP among possible beam candidates (e.g., a BM-RS, a NZP CSI-RS, an SSB) may be configured as a CMR and a NZP CSI-RS for other TRP may be configured as an IMR to configure a (CMR, IMR) pair.

The following example is an example in which a NZP CSI-RS for TRP 1 (e.g., NZP CSI-RS 1/2) is configured as a CMR and a NZP CSI-RS for TPR 2 (e.g., NZP CSI-RS 3/4) is configured as an IMR.

(CMR, IMR)={(NZP CSI-RS 1, NZP CSI-RS 3), (NZP CSI-RS 1, NZP CSI-RS 4), (NZP CSI-RS 2, NZP CSI-RS 3), (NZP CSI-RS 2, NZP CSI-RS 4)}

A UE may calculate $L1\text{-}SINR_{ij}$ by applying a reception beam/panel (i.e., QCL type D) of NZP CSI-RS i (i.e., a CMR) to a CMR and an IMR for the (NZP CSI-RS i, NZP CSI-RS j). In other words, a UE may apply a QCL type D (i.e., spatial Rx parameter) RS configured for NZP CSI-RS i configured for channel measurement as a reference RS for determining a QCL type D (i.e., spatial Rx parameter) assumption for corresponding NZP CSI-RS i and NZP CSI-RS j for interference measurement and calculate $L1\text{-}SINR_{ij}$.

And, a UE may calculate $L1\text{-}SINR_{ij}'$ by applying a reception beam/panel (i.e, QCL type D) of NZP CSI-RS j (i.e., an IMR) to a CMR and an IMR. In other words, a UE may apply a QCL type D (i.e., spatial Rx parameter) RS configured for NZP CSI-RS j configured for interference measurement as a reference RS for determining a QCL type D (i.e., spatial Rx parameter) assumption for corresponding NZP CSI-RS j and corresponding NZP CSI-RS i for channel measurement and calculate $L1\text{-}SINR_{ij}'$. Here, $L1\text{-}SINR_{ij}'$ means a SINR value when receiving data of TRP 1 by using a reception beam/panel used to receive data from TRP 2. In other words, it means that as a value of $L1\text{-}SINR_{ij}'$ is smaller, a reception SINR is larger when receiving data from TRP 2 and that as a value of $L1\text{-}SINR_{ij}$ is larger, a reception SINR is larger when receiving data from TRP 1.

A UE may report best N (N is a natural number) L1-SINRs (i.e., N L1-SINRs with the largest value) to a base station. In other words, a UE may report a i, j pair corresponding to best N L1-SINRs as a CRI to a base station and report a L1-SINR value for a corresponding i, j pair to a base station.

And, a UE additionally reports worst N L1-SINR's (i.e., N L1-SINR's with the smallest value). In other words, a UE may report a i, j pair corresponding to worst N L1-SINR's as a CRI to a base station and report a L1-SINR value for a corresponding i, j pair to a base station.

The best N $L1\text{-}SINR_{ij}$s inform a base station of the best beam pair i, j in order when receiving data of TP 1 with an Rx beam in a TP 1 direction and the worst N L1-SINR_ij's inform a base station of the worst beam pair i, j in order when receiving data of TP 1 with an Rx beam in a TP 2 direction.

Alternatively, a UE may save an UL resource by reporting only a i, j pair corresponding to worst N $L1\text{-}SINR_{ij}$s to a base station without reporting a $L1\text{-}SINR_{ij}'$ value corresponding to it to a base station.

Here, $(L1\text{-}SINR_{ij}')^{-1}$ is the same as $L1\text{-}SINR_{ji}$. Accordingly, a UE may report to a base station best N $(L1\text{-}SINR_{ij}')^{-1}$s instead of worst N $L1\text{-}SINR_{ij}$'s. In other words, as described above, all worst N $L1\text{-}SINR_{ij}$'s may be replaced with best N $(L1\text{-}SINR_{ij}')^{-1}$s and a UE may report i) best N $L1\text{-}SINR_{ij}$s and ii) best N $(L1\text{-}SINR_{ij}')^{-1}$s to a base station. In this case, $(L1\text{-}SINR_{ij}')^{-1}$ has an advantage that a quantization table for reporting the existing L1-SINR value may be used as it is.

Alternatively, a UE may report to a base station a difference value between $L1\text{-}SINR_{ij}$ and $(L1\text{-}SINR')^{-1}$ instead of a $(L1\text{-}SINR_{ij}')^{-1}$ value. In other words, a UE may report to a base station a difference value between i) best N $L1\text{-}SINR_{ij}$s and ii) $(L1\text{-}SINR')^{-1}$ corresponding to best N $L1\text{-}SINR_{ij}$s (i.e., N difference values).

Alternatively, a UE may report best N $L1\text{-}SINR_{ij}$s to a base station and may also report to a base station a value of $L1\text{-}SINR_{ij}'^{-1}$ or $L1\text{-}SINR_{ij}'$ corresponding to that i, j.

Alternatively, a UE may find best N (i, j) pairs with a large $L1\text{-}SINR_{ij}+(L1\text{-}SINR_{ij}')^{-1}$ (and report a found (i, j) pair) and report to a base station $L1\text{-}SINR_{ij}$ or $(L1\text{-}SINR_{ij}')^{-1}$ corresponding to it or a sum of two. Alternatively, a UE may find best N (i, j) pairs with a large tput ($L1\text{-}SINR_{ij}$)+tput (($L1\text{-}SINR_{ij}')^{-1}$) (and report a found (i, j) pair) and report to a base station $L1\text{-}SINR_{ij}$ or $(L1\text{-}SINR_{ij}')^{-1}$ corresponding to it or a sum of two. Alternatively, in the Equation, i, j were found by a simple sum of L1-SINRs or tputs, but differently from it, a UE may find i, j which maximize the minimum value of $L1\text{-}SINR_{ij}$ and $(L1\text{-}SINR_{ij}')^{-1}$ or find i, j which maximize the minimum value of tput ($L1\text{-}SINR_{ij}$) and tput (($L1\text{-}SINR_{ij}')^{-1}$) (and report a found (i, j) pair) and report to a base station $L1\text{-}SINR_{ij}$ or $(L1\text{-}SINR_{ij}')^{-1}$ corresponding to it or a sum of two.

Proposal 2)

L1-SINR beam reporting configured for a UE may be configured as follows. A NZP CSI-RS for a specific TRP among possible beam candidates (e.g., a BM-RS, a NZP CSI-RS, an SSB) may be configured as a CMR and a NZP CSI-RS for other TRP may be configured as an IMR to configure a (CMR, IMR) pair.

The following example is an example in which a NZP CSI-RS for TRP 1 (e.g., NZP CSI-RS 1/2) is configured as a CMR and a NZP CSI-RS for TPR 2 (e.g., NZP CSI-RS 3/4) is configured as an IMR.

(CMR, IMR)={(NZP CSI-RS 1, NZP CSI-RS 3), (NZP CSI-RS 1, NZP CSI-RS 4), (NZP CSI-RS 2, NZP CSI-RS 3), (NZP CSI-RS 2, NZP CSI-RS 4)}

A UE may calculate $L1\text{-}SINR_{ij}$ for the (NZP CSI-RS NZP CSI-RS j) and report it to a base station. In addition, a UE may additionally calculate $L1\text{-}ISNR_{ij}$ and report it to a base station. Here, $L1\text{-}ISNR_{ij}$ means an interference to signal plus noise power ratio that measurement power of an IMR is configured as a numerator and measurement power of a CMR is configured as a denominator. Here, reception power of a CMR and an IMR may be measured by applying a reception beam/panel (i.e., QCL type D) of NZP CSI-RS j (i.e., an IMR). In other words, a UE may apply a QCL type D (i.e., spatial Rx parameter) RS configured for NZP CSI-RS j configured for interference measurement as a reference RS for determining a QCL type D (i.e., spatial Rx parameter) assumption for corresponding NZP CSI-RS j and NZP CSI-RS i for channel measurement and calculate L1-ISNR$_{ij}$. Accordingly, L1-ISNR$_{ij}$ is L1-SINR$_{ji}$.

A UE may report best N (N is a natural number) L1-SINRs (i.e., N L1-SINRs with the largest value) to a base station. In other words, a UE may report a i, j pair corresponding to best N L1-SINRs as a CRI to a base station and report a L1-SINR value for a corresponding i, j pair to a base station.

In addition, a UE may additionally report best N L1-ISNRs to a base station.

best N L1-SINR$_{ij}$s inform a base station of the best beam pair i, j in order when receiving data of TP 1 with an Rx beam in a TP 1 direction and best N L1-ISNR$_{ij}$s inform a base station of the best beam pair i, j in order when receiving data of TP 2 with an Rx beam in a TP 2 direction.

Alternatively, a UE may save an UL resource by reporting only a i, j pair corresponding to best N L1-ISNR$_{ij}$s to a base station without reporting a L1-ISNR$_{ij}$ value corresponding to it to a base station.

Alternatively, a UE may report a difference value between L1-SINR$_{ij}$ and L1-ISNR$_{ij}$ instead of a L1-ISNR$_{ij}$ value. In other words, a UE may report to a base station a difference value between i) best N L1-SINR$_{ij}$s and ii) L1-ISNR$_{ij}$ corresponding to best N L1-SINR$_{ij}$s (i.e., N difference values).

Alternatively, a UE may report best N L1-SINR$_{ij}$s and also report a value of L1-ISNR$_{ij}$ corresponding to that i, j together to a base station.

Alternatively, a UE may find best N (i, j) pairs with a large L1-SINR$_{ij}$+(L1-ISNR$_{ij}$) (and report a found (i, j) pair) and report to a base station L1-SINR$_{ij}$ or (L1-ISNR$_{ij}$) corresponding to it or a sum of two. Alternatively, a UE may find best N (i, j) pairs with a large tput (L1-SINR$_{ij}$)+tput ((L1-ISNR$_{ij}$)) (and report a found (i, j) pair) and report to a base station L1-SINR$_{ij}$ or (L1-ISNR$_{ij}$) corresponding to it or a sum of two. Alternatively, in the Equation, i, j were found by a simple sum of L1-SINRs or tputs, but differently from it, a UE may find i, j which maximize the minimum value of L1-SINR$_{ij}$ and (L1-ISNR$_{ij}$) or find i, j which maximize the minimum value of tput (L1-SINR$_{ij}$ and tput ((L1-ISNR$_{ij}$)) (and report a found (i, j) pair) and report to a base station L1-SINR$_{ij}$ or (L1-ISNR$_{ij}$) corresponding to it or a sum of two.

Proposal 3)

L1-SINR beam reporting configured for a UE may be configured as follows.

(CMR, IMR)={Group A (NZP CSI-RS 1, NZP CSI-RS 3), (NZP CSI-RS 3, NZP CSI-RS 1), Group B (NZP CSI-RS 1, NZP CSI-RS 4), (NZP CSI-RS 4, NZP CSI-RS 1), Group C (NZP CSI-RS 2, NZP CSI-RS 3), (NZP CSI-RS 3, NZP CSI-RS 2), Group D (NZP CSI-RS 2, NZP CSI-RS 4), (NZP CSI-RS 4, NZP CSI-RS 2)}

A base station may group CMR and IMR pairs and configure it to a UE. Here, for example, Group A may be configured as (NZP CSI-RS 1, NZP CSI-RS 3), (NZP CSI-RS 3, NZP CSI-RS 1).

In other words, a base station may configure a group (or a resource group) for one or more CMR, IMR pairs (i.e., for L1-SINR measurement) to a UE. In other words, a base station may transmit configuration information on a group (or a resource group) for a CMR, IMR pair (i.e., for L1-SINR measurement) to a UE through RRC signaling (or an information element).

A UE may calculate L1-SINR values with a CMR, IMR pair belonging to the same group. For example, for Group A, L1-SINR$_{13}$ and L1-SINR$_{31}$ are calculated. Specifically, a UE may measure a L1-SINR by assuming a first resource belonging to the same group as a CMR and a second resource as an IMR and conversely, may measure a L1-SINR by assuming a second resource belonging to a corresponding group as a CMR and a first resource as an IMR. In other words, a UE may calculate 2 L1-SINR values per resource pair. Similarly, a UE may calculate L1-SINR values per each group for all configured groups.

And, a UE may report best N (N is a natural number) (L1-SINR) groups to a base station based on a SINR value calculated for each group.

A base station may directly signal grouping information to a UE. For example, as in the above-described example, a base station may directly configure for a UE with group information that Group A is (NZP CSI-RS 1, NZP CSI-RS 3), (NZP CSI-RS 3, NZP CSI-RS 1).

Alternatively, a base station may signal only a measurement resource of a group (i.e., a resource included in a group) to a UE and in this case, indirectly (implicitly), a resource of a CMR and an IMR may be promised/configured by grouping exchanged pairs. For example, if a base station configures only a measurement resource of a group (e.g., NZP CSI-RS 1, NZP CSI-RS 3) to a UE, it may be promised/defined as being grouped with pairs by alternating order of corresponding measurement resources.

A method that a UE selects/reports best N groups is as follows.

A UE may select best N groups with a larger value by comparing a L1-SINR value calculated with a first (or last) CMR, IMR pair of each group. For example, in the example, a case in which a L1-SINR calculated with a first CMR, IMR pair is compared is assumed. In this case, each L1-SINR value may be compared for (NZP CSI-RS 1, NZP CSI-RS 3) in Group A, (NZP CSI-RS 1, NZP CSI-RS 4) in Group B, (NZP CSI-RS 2, NZP CSI-RS 3) in Group C and (NZP CSI-RS 2, NZP CSI-RS 4) in Group D. Based on it, a UE may select best N groups with the largest value.

Alternatively, a UE may compare a sum of L1-SINR values calculated with a CMR, IMR pair of each group to select best N groups with a large value. For example, in the example, a sum of a L1-SINR value for (NZP CSI-RS 1, NZP CSI-RS 3) and a L1-SINR value for (NZP CSI-RS 3, NZP CSI-RS 1) may be calculated in Group A, a sum of a L1-SINR value for (NZP CSI-RS 1, NZP CSI-RS 4) and a L1-SINR value for (NZP CSI-RS 4, NZP CSI-RS 1) may be calculated in Group B, a sum of a L1-SINR value for (NZP CSI-RS 2, NZP CSI-RS 3) and a L1-SINR value for (NZP CSI-RS 3, NZP CSI-RS 2) may be calculated in Group C and a sum of a L1-SINR value for (NZP CSI-RS 2, NZP CSI-RS 4) and a L1-SINR value for (NZP CSI-RS 4, NZP CSI-RS 2) may be calculated in Group D and a sum of L1-SINR values in each group may be compared. Based on it, UE may select the best N group with the largest value.

Alternatively, a UE may substitute a L1-SINR calculated with a CMR, IMR pair of each group with a tput to find a sum of tput values and select best N groups with a large value. For example, in the example, a sum of a tput value substituted for a L1-SINR value for (NZP CSI-RS 1, NZP CSI-RS 3) and a tput value substituted for a L1-SINR value for (NZP CSI-RS 3, NZP CSI-RS 1) may be calculated in Group A, a sum of a tput value substituted for a L1-SINR value for (NZP CSI-RS 1, NZP CSI-RS 4) and a tput value substituted for a L1-SINR value for (NZP CSI-RS 4, NZP CSI-RS 1) may be calculated in Group B, a sum of a tput value substituted for a L1-SINR value for (NZP CSI-RS 2, NZP CSI-RS 3) and a tput value substituted for a L1-SINR value for (NZP CSI-RS 3, NZP CSI-RS 2) may be calculated in Group C and a sum of a tput value substituted for a L1-SINR value for (NZP CSI-RS 2, NZP CSI-RS 4) and a tput value substituted for a L1-SINR value for (NZP CSI-RS 4, NZP CSI-RS 2) may be calculated in Group D and a sum of tput values in each group may be compared. Based on it, a UE may select best N groups with the largest value.

Alternatively, a UE may find the minimum value of a L1-SINR or tput value calculated with a CMR, IMR pair of each group and select best N groups with the largest minimum value. For example, in the example, the minimum value of a L1-SINR value (or a tput value) for (NZP CSI-RS 1, NZP CSI-RS 3) and a L1-SINR value (or a tput value) for (NZP CSI-RS 3, NZP CSI-RS 1) may be calculated in Group A, the minimum value of a L1-SINR value (or a tput value) for (NZP CSI-RS 1, NZP CSI-RS 4) and a L1-SINR value (or a tput value) for (NZP CSI-RS 4, NZP CSI-RS 1) may be calculated in Group B, the minimum value of a L1-SINR value (or a tput value) for (NZP CSI-RS 2, NZP CSI-RS 3) and a L1-SINR value (or a tput value) for (NZP CSI-RS 3, NZP CSI-RS 2) may be calculated in Group C and the minimum value of a L1-SINR value (or a tput value) for (NZP CSI-RS 2, NZP CSI-RS 4) and a L1-SINR value (or a tput value) for (NZP CSI-RS 4, NZP CSI-RS 2) may be calculated in Group D and the minimum value of L1-SINR values (or tput values) in each group may be compared. Based on it, a UE may select best N groups with the largest value.

And, a UE may report selected best N groups to a base station. Here, a UE may directly report grouping information (e.g., a group identifier, etc.) to a base station. Alternatively, a UE may also report information on a measurement resource of a group, i.e., an i, j pair belonging to best N groups as a CRI to a base station.

In addition, a UE may report a L1-SINR corresponding to best N groups to a base station as the following value.

A UE may report a L1-SINR value calculated with a first (or last) CMR, IMR pair of that Best N groups to a base station.

Alternatively, a UE may report all L1-SINR values calculated with a CMR, IMR pair of that Best N groups to a base station. Here, a L1-SINR value of remaining CMR, IMR pairs may be reported as a differential value based on a L1-SINR value of specific one of a plurality of CMR, IMR pairs of Best N groups. In other words, a L1-SINR value of specific one of a plurality of CMR, IMR pairs of Best N groups may be reported as it is and a L1-SINR value of remaining CMR, IMR pairs may be reported as a differential value. For example, a difference of a L1-SINR calculated with remaining CMR, IMR pairs of a corresponding group may be reported based on a L1-SINR calculated with a first CMR, IMR pair of Best N groups.

<Method 4>

L1-SINR beam reporting configured for a UE may be configured as follows. A NZP CSI-RS for a specific TRP among possible beam candidates (e.g., a BM-RS, a NZP CSI-RS, an SSB) may be configured as a CMR and a NZP CSI-RS for other TRP may be configured as an IMR to configure a (CMR, IMR) pair.

The following example is an example in which a NZP CSI-RS for TRP 1 (e.g., NZP CSI-RS 1/2) is configured as a CMR and a NZP CSI-RS for TPR 2 (e.g., NZP CSI-RS 3/4) is configured as an IMR.

(CMR, IMR)={(NZP CSI-RS 1, NZP CSI-RS 3), (NZP CSI-RS 1, NZP CSI-RS 4), (NZP CSI-RS 2, NZP CSI-RS 3), (NZP CSI-RS 2, NZP CSI-RS 4)}

UE may calculate L1-SINR$_{ij}$ for the (NZP CSI-RS i, NZP CSI-RS j) and additionally measure port power of NZP CSI-RS j configured as an IMR and calculate a L1-RSRP (it is referred to as a 'IMR based L1-RSRP') to report it to a base station. Here, UE may measure power by applying a reception beam/panel (i.e., QCL type D) of NZP CSI-RS j (i.e., an IMR).

A UE may report best N (N is a natural number) L1-SINRs (i.e., N L1-SINRs with the largest value) to a base station. In other words, a UE may report a i, j pair corresponding to best N L1-SINRs as a CRI to a base station and report a L1-SINR value for a corresponding i, j pair to a base station. And, a UE may additionally report best N 'IMR based L1-RSRP's to a base station. Alternatively, a UE may report only a i, j pair corresponding to best N 'IMR based L1-RSRP's to a base station and may save an UL resource by not reporting a L1-ISNR$_{ij}$ value.

Alternatively, a UE may report best N L1-SINR$_{ij}$s and also report a value of a 'IMR based L1-RSRP' corresponding to that ij together to a base station. In other words, separately from (or together with) the above-described best N 'IMR based L1-RSRP's, a value of a 'IMR based L1-RSRP' corresponding to ij of best N L1-SINR$_{ij}$s may be also reported to a base station.

Alternatively, a UE may find i, j which maximize the minimum value of L1-SINR$_{ij}$ and/or IMR based L1-RSRP$_{ij}$ and report L1-SINR$_{ij}$ or (IMR based L1-RSRP$_{ij}$) corresponding to it to a base station. Alternatively, a UE calculates best N L1-SINR$_{ij}$s and reports best N L1-SINR$_{ij}$s only when a value of a IMR based L1-RSRP corresponding to that ij of best N L1-SINR$_{ij}$s is equal to or greater than a specific threshold value. In other words, a UE does not report all best N L1-SINR$_{ij}$s to a base station and may report to a base station one or more L1-SINR$_{ij}$s that a value of a IMR based L1-RSRP corresponding to ij of best N L1-SINR$_{ij}$s is equal to or greater than a specific threshold value. For example, when a UE reports all best N L1-SINRs to a base station, a UE assumes a case in which a first best L1 SINR and a second best L1 SINR are reported to a base station. But, in this example, according to the above-described method, if an RSRP value measured based on an IMR used to calculate a first best L1 SINR (i.e., an IMR based L1-RSRP value) is A, an RSRP value measured based on an IMR used to calculate a second best L1 SINR (i.e., an IMR based L1-RSRP value) is B, a threshold is C and A<C<B, a UE may report a second best L1 SINR to a base station and may not report a first best L1 SINR to a base station.

In the above-described method (proposal 1/2/3/4, etc.), for convenience of a description, it was described based on CSI/beam calculation/reporting of TRP 2, but similarly, CSI/BEAM of TRP 1 may be also calculated/reported with an inverse CQI. In addition, for convenience of a description, it was described based on an operation of 2 TRPs (e.g., TRP1/TRP 2), but, of course, it may be extended to a plurality of TRP operations. For example, for 3 TRPs, one (CMR, IMR combination) may be configured with resource 1 corresponding to TRP 1, resource 2 corresponding to TRP 2 and resource 3 corresponding to TRP 3. And, when a specific measurement resource is used as a CMR in a (CMR, IMR combination), remaining resources (or any one of remaining resources) are used as an IMR, so a L1-SINR may be calculated.

In the present disclosure, it is described based on a 'TRP', but as described above, a "TRP" may be applied by being substituted with an expression such as a panel, a cell, a transmission point (TP), a base station (gNB, etc.), etc. In addition, as described above, a TRP may be classified according to information on a CORESET group (or a CORESET pool) (e.g., an index). In an example, when one terminal is configured to perform transmission and reception with multiple TRPs (or cells), it may mean that multiple CORESET groups (or CORESET pools) are configured for one terminal. Such a configuration on a CORESET group (or a CORESET pool) may be performed through higher layer signaling (e.g., RRC signaling, etc.). In addition, when multiple CORESET groups are configured for one terminal, a corresponding terminal may be configured or defined to receive data by using a multiple DCI based M-TRP operation.

Figure 14:
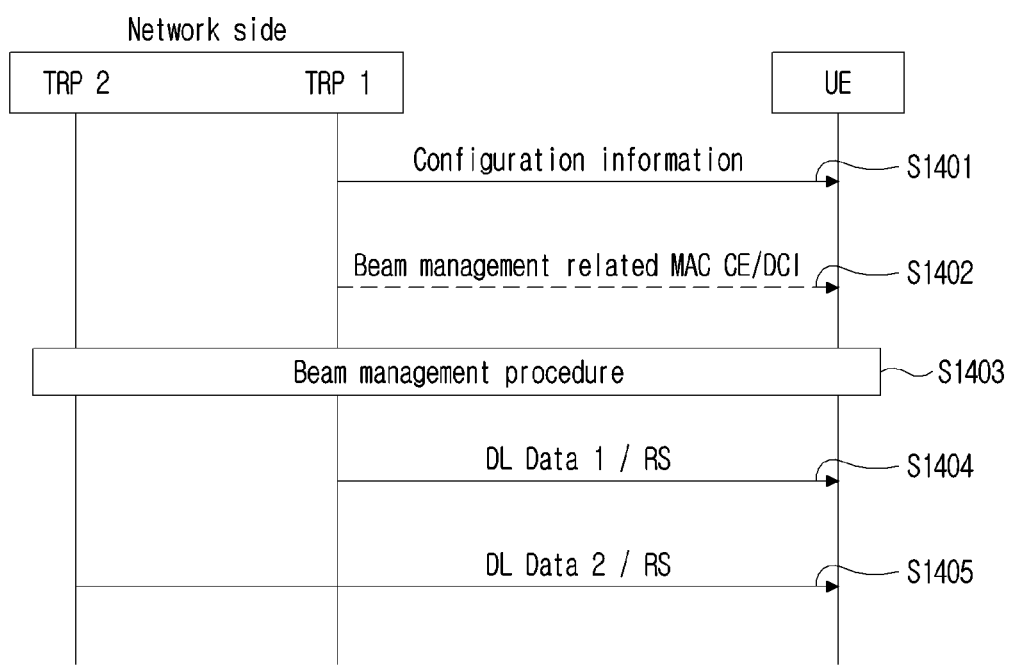
FIG. 14 is a diagram which illustrates a signaling procedure between a network and a terminal for a method of transmitting and receiving channel state information according to an embodiment of the present disclosure.

FIG. 14 is a diagram which illustrates a signaling procedure between a network and a terminal for a method of transmitting and receiving channel state information according to an embodiment of the present disclosure.

FIG. 14 represents signaling between a network (e.g., TRP 1/TRP 2) and a UE in a situation of multiple TRPs (i.e., M-TRPs, or multiple cells, hereinafter, all TRPs may be replaced with a cell) to which methods proposed in the present disclosure (e.g., proposal 1/2/3/4, etc.) may be applied. (Here, a UE/a network is just an example, and may be applied by being substituted with a variety of devices as described in FIG. 17.) FIG. 14 is just for convenience of a description, and does not limit a scope of the present disclosure. In reference to FIG. 14, a case is assumed in which a UE performs a beam management procedure according to a configuration and/or an indication of a network (e.g., TRP 1/TRP 2). In addition, some step(s) shown in FIG. 14 may be omitted according to a situation and/or a configuration, etc. In addition, contents describing the above-described beam management (BM) operation may be applied/used.

In reference to FIG. 14, for convenience of a description, signaling between 2 TRPs and a UE is considered, but it goes without saying that a corresponding signaling method may be extended and applied to signaling between multiple TRPs and multiple UEs. In the following description, a network may be one base station including a plurality of TRPs or may be one cell including a plurality of TRPs. In an example, an ideal/a non-ideal backhaul may be configured between TRP 1 and TRP 2 configuring a network. In addition, the following description is described based on multiple TRPs, but it may be equally extended and applied to transmission through multiple panels. In addition, in the present disclosure, an operation that a terminal receives a signal from TRP1/TRP2 may be interpreted/described (or may be an operation) as an operation that a terminal receives a signal from a network (through/with TRP1/2) and an operation that a terminal transmits a signal to TRP1/TRP2 may be interpreted/described (or may be an operation) as an operation that a terminal transmits a signal to a network (through/with TRP1/TRP2) or may be inversely interpreted/described.

A UE may receive a configuration through/with TRP1 and/or TRP2 from a network S1401. The configuration may include system information (SI) and/or scheduling information and/or a beam management (BM) related configuration (e.g., a DL BM related CSI-ResourceConfig IE/a NZP CSI-RS resource set IE, etc.) and/or a CSI related configuration.

In addition, the configuration may include information related to a configuration of a network (i.e., a TRP configuration), resource information related to multiple TRP based transmission and reception (resource allocation), etc. The configuration may be transmitted to a higher layer (e.g., RRC or MAC CE). In addition, when the configuration information is predefined or preconfigured, a corresponding step may be omitted.

For example, the configuration may include BM related configuration information (e.g., a BM-RS, CSI-RS related information, measurement parameter related information, etc.) described in the above-described proposals (e.g., proposal 1/2/3/4, etc.). For example, the configuration may include measurement resource information (e.g., CMR/IMR information) on a beam candidate for each TRP. For example, information on a CMR/IMR configuration between a beam candidate of a specific TRP and a beam candidate of other TRP may be received. For example, measurement resource information (e.g., CMR/IMR information) on beam candidates for the each TRP may be configured in a group form.

For example, configuration information may include information on M (M is a natural number) RS resource groups. Here, M RS resource groups may be information on a measurement resource (e.g., CMR/IMR information) for the above-described beam candidates for each TRP.

In addition, each of the M RS resource groups may include one or more RS resource pairs configured with an RS resource for channel measurement and an RS resource for interference measurement. Here, as an indirect method, information on the M RS resource groups may include information on RS resources included in each of the M RS resource groups and the one or more RS resource pairs in each of the M RS resource groups may be configured by a combination of the RS resources (i.e., it may be promised/defined in advance between a terminal and a network). In an example, if information on a specific RS resource group includes a first RS resource and a second RS resource, a first RS resource pair configured with a first RS resource for channel measurement and a second RS resource for interference measurement and a second RS resource pair configured with a second RS resource for channel measurement and a first RS resource for interference measurement may be configured in the specific RS resource group. Alternatively, as a direct method, information on the M RS resource groups may include information on the one or more RS resource pairs included in each of the M RS resource groups.

For example, the above-described operation that a UE (100/200 in FIG. 17) in S1401 receives the configuration from a network side (100/200 in FIG. 17) may be implemented by a device in FIG. 17 which will be described below. For example, in reference to FIG. 17, one or more processors 102 may control one or more transceivers 106 and/or one or more memories 104, etc. to receive the configuration and one or more transceivers 106 may receive the configuration from a network.

A UE may receive BM related information through MAC-CE and/or DCI through/with TRP 1 (and/or TRP 2) from a Network S1402.

For example, as in the above-described proposal (e.g., proposal 1/2/3/4, etc.), a UE may receive BM procedure and/or BM related configuration information through MAC-CE signaling and/or DCI. In addition, when the BM related information is predefined or preconfigured, a corresponding step may be omitted.

For example, the above-described operation that a UE (100/200 in FIG. 17) in S1402 receives the BM related information from a network (100/200 in FIG. 17) may be implemented by a device in FIG. 17 which will be described below. For example, in reference to FIG. 17, one or more processors 102 may control one or more transceivers 106 and/or one or more memories 104, etc. to receive the BM related information and one or more transceivers 106 may receive the BM related information from a network.

A UE may perform a BM procedure with a network (through/with TRP 1 and/or TRP 2) S1403.

For example, a UE may perform the BM procedure based on the above-described proposal (e.g., proposal 1/2/3/4, etc.).

For example, a UE may receive an RS (e.g., a BM-RS, an SSB, a CSI-RS, etc.) for beam reporting through/with TRP1 and/or TRP2 from a network. For example, when an RS is received through/with multiple TRPs, information on a relationship between RSs (e.g., a CMR/IMR relationship, RS group information, etc.) may be received.

For example, a UE may perform measurement for beam reporting (e.g., a L1-SINR/L1-RSRP) based on a configuration received from a network and the RS (e.g., BM and/or CSI related configuration information, information indicated by DCI, etc.). In other words, a UE may perform measurement for beam reporting (e.g., a L1-SINR/L1-RSRP) based on one or more RS resources.

For example, a UE may perform measurement considering a case in which two or more beams are received at the same time based on multi-TRP transmission. In the present disclosure, a beam may be equally interpreted as an RS being transmitted by a downlink spatial domain transmission filter. In other words, when an RS is transmitted/received by a different beam, it may be interpreted that an RS is transmitted/received by a different downlink spatial domain transmission filter.

For example, a UE may measure a L1-SINR based on a NZP CSI-RS for a first TRP for beam reporting for a first TRP and measure a L1-SINR' (i.e., a SINR value when receiving data of first TRP 1 by using an Rx beam/panel (i.e., QCL type D) used when receiving data from second TRP 2) based on a NZP CSI-RS for a second TRP. For example, a UE may calculate a L1-ISNR. For example, a UE may calculate L1-RSRP by applying an Rx beam/panel of a resource configured as an IMR (i.e., QCL type D).

A UE may perform beam reporting through/with TRP1 and/or TRP2 to a network. For example, the beam reporting may be performed based on the above-described contents in DL BM and/or the above-described proposal (proposal 1/2/3/4, etc.). For example, a UE may report best N L1-SINRs and/or a CRI and/or a L1-SINR' and/or L1-RSRP and/or a L1-ISNR, etc. Such beam reporting may be transmitted to a base station by being included in CSI.

For example, when measurement resource information for beam candidates for each TRP (e.g., CMR/IMR information) is configured in a group form, a UE may perform measurement/reporting for beam reporting in a group unit based on the above-described proposal 3.

In addition, for example, a case is assumed in which M (M is a natural number) RS resource groups are configured and RS resource groups include one or more RS resource pairs configured with an RS resource for channel measurement and an RS resource for interference measurement.

In this case, information on N (N≤M, N is a natural number) RS resource groups selected from the M RS resource groups and a L1-SINR value for the N RS resource groups may be reported to a base station.

Here, the N resource groups with a larger value may be selected by comparing a L1-SINR calculated by a specific RS resource pair in each of the M RS resource groups. Alternatively, the N resource groups with a larger value may be also selected by comparing a sum of L1-SINRs calculated by the one or more RS resource pairs in each of the M RS resource groups. Alternatively, the N resource groups with a larger value may be selected by comparing a throughput value substituted from a L1-SINR calculated by the one or more RS resource pairs in each of the M RS resource groups. Alternatively, the N resource groups with a larger value may be selected by comparing the minimum value of a throughput value substituted from a L1-SINR or the minimum value of a L1-SINR calculated by the one or more RS resource pairs in each of the M RS resource groups.

In addition, a L1-SINR value calculated by a specific RS resource pair in the N RS resource groups may be reported to a base station as a L1-SINR value for the N RS resource groups. Alternatively, a L1-SINR value calculated by all RS resource pairs in the N RS resource groups may be reported to a base station as a L1-SINR value for the N RS resource groups. Here, the L1-SINR value calculated by all RS resource pairs may include a difference value between a L1-SINR calculated by a specific RS resource pair and a L1-SINR calculated by an RS resource pair other than a specific RS resource pair based on a L1-SINR calculated by the specific RS resource pair.

For example, the above-described operation that a UE (100/200 in FIG. 17) in S1403 performs a BM procedure with a network may be implemented by a device in FIG. 17 which will be described below. For example, in reference to FIG. 17, one or more processors 102 may control one or more transceivers 106 and/or one or more memories 104, etc. to perform the BM procedure.

A UE may receive DL data (e.g., data 1/data 2)/an RS (for data decoding) based on data scheduling information and/or scheduling information through/with TRP1 and/or TRP2 from a network S1404/S1405. In this case, the DL data/RS may be transmitted/received through an optimum beam selected/configured based on a BM procedure performed based on the above-described proposals (e.g., proposal 1/2/3/4, etc.). For example, the DL data may be received through a PDSCH.

For example, the above-described operation that a UE (100/200 in FIG. 17) in S1404/S1405 receives data/an RS based on the data scheduling information and/or scheduling information from a network (100/200 in FIG. 17) may be implemented by a device in FIG. 17 which will be described below. For example, in reference to FIG. 17, one or more processors 102 may control one or more transceivers 106 and/or one or more memories 104, etc. to receive data/an RS based on the data scheduling information and/or scheduling information and one or more transceivers 106 may receive data/an RS based on the data scheduling information and/or scheduling information from a network side.

As described above, the above-described Network/UE signaling and operation (e.g., proposal 1/2/3/4, etc.) may be implemented by a device (e.g., FIG. 17) which will be described below. For example, a network (e.g., TRP 1/TRP 2) may correspond to a first wireless device and a UE may correspond to a second wireless device and in some cases, the opposite may be considered.

Figure 17:
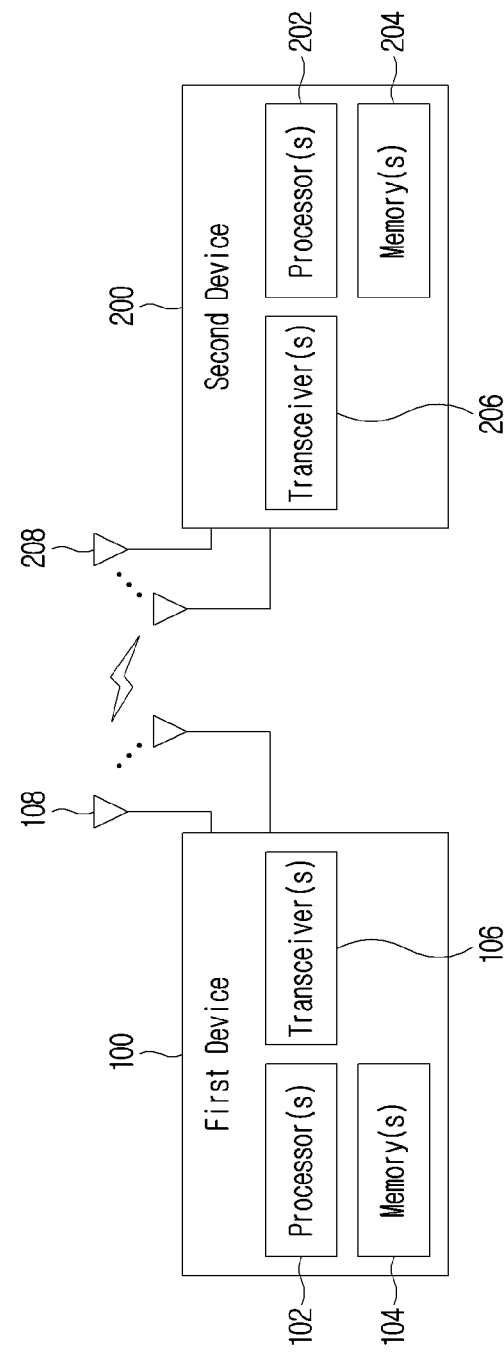
FIG. 17 illustrates a block diagram of a wireless communication device according to an embodiment of the present disclosure.

For example, the above-described network/UE signaling and operation (e.g., proposal 1/2/3/4, etc.) may be processed by one or more processors 102, 202 in FIG. 17 and the above-described network/UE signaling and operation (e.g., proposal 1/2/3/4, etc.) may be stored in a memory (e.g., one or more memories 104, 204 in FIG. 17) in a command/program form (e.g., an instruction, an executable code) for driving at least one processor in FIG. 17 (e.g., 102, 202).

Figure 15:
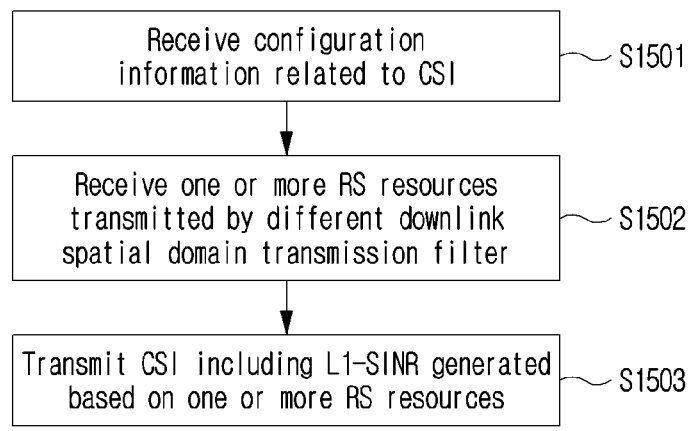
FIG. 15 is a diagram which illustrates an operation of a terminal for a method of transmitting channel state information according to an embodiment of the present disclosure.

FIG. 15 is a diagram which illustrates an operation of a terminal for a method of transmitting channel state information according to an embodiment of the present disclosure.

FIG. 15 illustrates an operation of a terminal based on the proposal 1 to proposal 4. An example in FIG. 15 is for convenience of a description, and it does not limit a scope of the present disclosure. Some step(s) illustrated in FIG. 15 may be omitted according to a situation and/or a configuration. In addition, in FIG. 15, a terminal is just one example, and may be implemented by a device illustrated in the following FIG. 17. For example, a processor 102/202 in FIG. 17 may be controlled to transmit and receive a channel/a signal/data/information, etc. by using a transceiver 106/206 and may be also controlled to store a channel/a signal/data/information, etc. which will be transmitted or received in a memory 104/204.

In addition, an operation in FIG. 15 may be processed by one or more processors 102, 202 in FIG. 17 and an operation in FIG. 15 may be stored in a memory (e.g., one or more memories 104, 204 in FIG. 17) in a form of a command/a program (e.g., an instruction, an executable code) for driving at least one processor (e.g., 102, 202) in FIG. 17.

In reference to FIG. 15, a terminal receives CSI related configuration information from a base station S1501.

Here, the configuration information may include BM related (or CSI related) configuration information (e.g., a BM-RS, CSI-RS related information, measurement parameter related information, etc.) described in the above-described proposals (e.g., proposal 1/2/3/4, etc.).

For example, according to the proposal 1, 2, 4, configuration information may include information on a pair of an RS resource (CMR) for channel measurement and an RS resource (IMR) for interference measurement.

Alternatively, according to the proposal 3, configuration information may include information on M (M is a natural number) RS resource groups. Each of the M RS resource groups may include one or more RS resource pairs configured with an RS resource for channel measurement and an RS resource for interference measurement. Here, information on the M RS resource groups may include only information on RS resources included in each of the M RS resource groups (i.e., without information on an RS resource pair) and the one or more RS resource pairs in each of the M RS resource groups may be configured by a combination of the RS resources. For example, if information on a specific RS resource group includes a first RS resource and a second RS resource, a first RS resource pair configured with a first RS resource for channel measurement and a second RS resource for interference measurement and a second RS resource pair configured with a second RS resource for channel measurement and a first RS resource for interference measurement may be configured in the specific RS resource group. Alternatively, information on the M RS resource groups may include information on the one or more RS resource pairs included in each of the M RS resource groups.

A terminal receives one or more RS (reference signal) resources transmitted by a different downlink spatial domain transmission filter from a base station S1502.

Here, an RS may correspond to an RS for beam reporting (e.g., a BM-RS, an SSB, a CSI-RS). In addition, when an RS is transmitted by a different downlink spatial domain transmission filter, it may be interpreted that an RS is transmitted by a different beam.

A terminal transmits CSI including a L1-SINR generated based on one or more RS resources to a base station S1503.

Here, CSI may include best N L1-SINRs and/or a CRI and/or a L1-SINR' and/or L1-RSRP and/or a L1-ISNR, etc. calculated by a terminal based on the above-described proposal (proposal 1/2/3/4, etc.).

For example, according to proposal 3, CSI may include information on N (N≤M, N is a natural number) RS resource groups selected from the M RS resource groups and a L1-SINR value for the N RS resource groups. Here, the N resource groups with a larger value may be selected by comparing a L1-SINR calculated by a specific RS resource pair in each of the M RS resource groups. Alternatively, the N resource groups with a larger value may be also selected by comparing a sum of L1-SINRs calculated by the one or more RS resource pairs in each of the M RS resource groups. Alternatively, the N resource groups with a larger value may be also selected by comparing a throughput value substituted from a L1-SINR calculated by the one or more RS resource pairs in each of the M RS resource groups. Alternatively, the N resource groups with a larger value may be also selected by comparing the minimum value of a throughput value substituted from a L1-SINR or the minimum value of a L1-SINR calculated by the one or more RS resource pairs in each of the M RS resource groups.

In addition, a L1-SINR value calculated by a specific RS resource pair in the N RS resource groups may be reported to a base station as a L1-SINR value for the N RS resource groups. Alternatively, a L1-SINR value calculated by all RS resource pairs in the N RS resource groups may be reported to a base station as a L1-SINR value for the N RS resource groups. Here, the L1-SINR value calculated by all RS resource pairs may include a difference value between a L1-SINR calculated by a specific RS resource pair and a L1-SINR calculated by an RS resource pair other than a specific RS resource pair based on a L1-SINR calculated by the specific RS resource pair.

Figure 16:
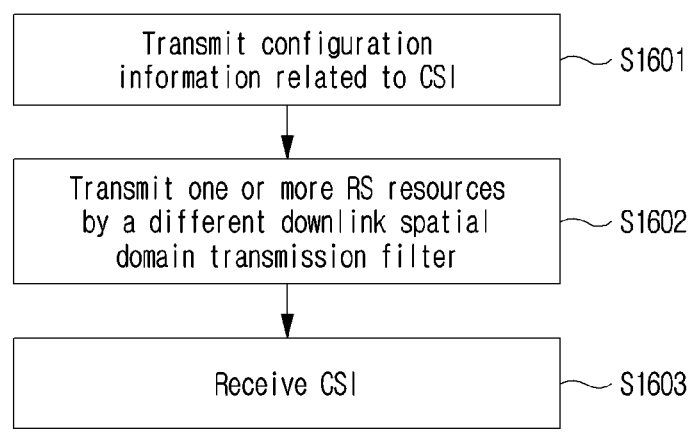
FIG. 16 is a diagram which illustrates an operation of a base station for a method of receiving channel state information according to an embodiment of the present disclosure.

FIG. 16 is a diagram which illustrates an operation of a base station for a method of receiving channel state information according to an embodiment of the present disclosure.

FIG. 16 illustrates an operation of a base station based on the proposal 1 to proposal 4. An example in FIG. 16 is for convenience of a description, and it does not limit a scope of the present disclosure. Some step(s) illustrated in FIG. 16 may be omitted according to a situation and/or a configuration. In addition, in FIG. 18, a base station is just one example, and may be implemented by a device illustrated in the following FIG. 17. For example, a processor 102/202 in FIG. 17 may be controlled to transmit and receive a channel/a signal/data/information, etc. by using a transceiver 106/206 and may be also controlled to store a channel/a signal/data/information, etc. which will be transmitted or received in a memory 104/204.

In addition, an operation in FIG. 16 may be processed by one or more processors 102, 202 in FIG. 17 and an operation in FIG. 16 may be stored in a memory (e.g., one or more memories 104, 204 in FIG. 17) in a form of a command/a program (e.g., an instruction, an executable code) for driving at least one processor (e.g., 102, 202) in FIG. 17.

In reference to FIG. 16, a base station transmits CSI related configuration information to a terminal S1601.

Here, configuration information may include BM related (or CSI related) configuration information (e.g., a BM-RS, CSI-RS related information, measurement parameter related information, etc.) described in the above-described proposals (e.g., proposal 1/2/3/4, etc.).

For example, according to the proposal 1, 2, 4, configuration information may include information on a pair of an RS resource (CMR) for channel measurement and an RS resource (IMR) for interference measurement.

Alternatively, according to the proposal 3, configuration information may include information on M (M is a natural number) RS resource groups. Each of the M RS resource groups may include one or more RS resource pairs configured with an RS resource for channel measurement and an RS resource for interference measurement. Here, information on the M RS resource groups may include only information on RS resources included in each of the M RS resource groups (i.e., without information on an RS resource pair) and the one or more RS resource pairs in each of the M RS resource groups may be configured by a combination of the RS resources. For example, if information on a specific RS resource group includes a first RS resource and a second RS resource, a first RS resource pair configured with a first RS resource for channel measurement and a second RS resource for interference measurement and a second RS resource pair configured with a second RS resource for channel measurement and a first RS resource for interference measurement may be configured in the specific RS resource group. Alternatively, information on the M RS resource groups may include information on the one or more RS resource pairs included in each of the M RS resource groups.

A base station transmits one or more RS (reference signal) resources by a different downlink spatial domain transmission filter to a terminal S1602.

Here, an RS may correspond to an RS for beam reporting (e.g., a BM-RS, an SSB, a CSI-RS). In addition, when a RS is transmitted by a different downlink spatial domain transmission filter, it may be interpreted that an RS is transmitted by a different beam.

A base station receives CSI from a terminal S1603.

Here, CSI may include best N L1-SINRs and/or a CRI and/or a L1-SINR' and/or L1-RSRP and/or a L1-ISNR, etc. calculated by a terminal based on the above-described proposal (proposal 1/2/3/4, etc.).

For example, according to proposal 3, CSI may include information on N (N≤M, N is a natural number) RS resource groups selected from the M RS resource groups and a L1-SINR value for the N RS resource groups.

General Device to which the Present Disclosure May be Applied

FIG. 17 is a diagram which illustrates a block diagram of a wireless communication device according to an embodiment of the present disclosure.

In reference to FIG. 17, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206.

One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method of transmitting channel state information (CSI) in a wireless communication system, the method performed by a terminal comprising:
   receiving, from a base station, configuration information related to the CSI;
   receiving, from the base station, one or more RS (reference signal) resources transmitted by a different downlink spatial domain transmission filter; and
   transmitting, to the base station, the CSI including a L1-SINR (Layer 1 Signal-to-Interference-plus-Noise Ratio) generated based on the one or more RS resources,
   wherein the configuration information includes information on M (M is a natural number) RS resource groups,
   wherein each of the M RS resource groups includes one or more RS resource pairs configured with an RS resource for channel measurement and an RS resource for interference measurement,
   wherein the CSI includes information on N (N≤M, N is the natural number) RS resource groups selected from the M RS resource groups and a L1-SINR value for the N RS resource groups.

2. The method of claim 1, wherein:
   the information on the M RS resource groups includes information on RS resources included in each of the M RS resource groups,
   the one or more RS resource pairs in each of the M RS resource groups are configured by a combination of the RS resources.

3. The method of claim 1, wherein:
   based on information on a specific RS resource group including a first RS resource and a second RS resource, a first RS resource pair configured with the first RS resource for channel measurement and the second RS resource for interference measurement and a second RS resource pair configured with the second RS resource for channel measurement and the first RS resource for interference measurement are configured in the specific RS resource group.

4. The method of claim 1, wherein:
   the information on the M RS resource groups includes information on the one or more RS resource pairs included in each of the M RS resource groups.

5. The method of claim 1, wherein:
   by comparing a L1-SINR calculated by a specific RS resource pair in each of the M RS resource groups, the N resource groups with a large value are selected.

6. The method of claim 1, wherein:
   by comparing a sum of L1-SINRs calculated by the one or more RS resource pairs in each of the M RS resource groups, the N resource groups with a large value are selected.

7. The method of claim 1, wherein:
   by comparing a throughput value substituted from a L1-SINR calculated by the one or more RS resource pairs in each of the M RS resource groups, the N resource groups with a large value are selected.

8. The method of claim 1, wherein:
   by comparing a minimum value of a throughput value substituted from a L1-SINR or a minimum value of a L1-SINR calculated by the one or more RS resource pairs in each of the M RS resource groups, the N resource groups with a large value are selected.

9. The method of claim 1, wherein:
   the L1-SINR value for the N RS resource groups is a L1-SINR value calculated by a specific RS resource pair in the N RS resource groups.

10. The method of claim 1, wherein:
    the L1-SINR value for the N RS resource groups is a L1-SINR value calculated by all RS resource pairs in the N RS resource groups.

11. The method of claim 10, wherein:
    the L1-SINR value calculated by the all RS resource pairs includes a difference value between a L1-SINR calculated by a specific RS resource pair and a L1-SINR calculated by an RS resource pair other than the specific RS resource pair based on the L1-SINR calculated by the specific RS resource pair.

12. A terminal of transmitting channel state information (CSI) in a wireless communication system, the terminal comprising:
    at least one transceiver for transmitting and receiving a wireless signal; and
    at least one processor for controlling the at least one transceiver,
    wherein the at least one processor configured to:
    receive, from a base station, configuration information related to the CSI;

receive, from the base station, one or more RS (reference signal) resources transmitted by a different downlink spatial domain transmission filter; and transmit, to the base station, the CSI including a L1-SINR (Layer 1 Signal-to-Interference-plus-Noise Ratio) generated based on the one or more RS resources, wherein the configuration information includes information on M (M is a natural number) RS resource groups, wherein each of the M RS resource groups includes one or more RS resource pairs configured with an RS resource for channel measurement and an RS resource for interference measurement, wherein the CSI includes information on N (N≤M, N is the natural number) RS resource groups selected from the M RS resource groups and a L1-SINR value for the N RS resource groups.

13. A method of receiving channel state information (CSI) in a wireless communication system, the method performed by a base station comprising:

transmitting, to a terminal, configuration information related to the CSI;

transmitting, to the terminal, one or more RS (reference signal) resources by a different downlink spatial domain transmission filter; and receiving, from the terminal, the CSI, wherein the configuration information includes information on M (M is a natural number) RS resource groups, wherein each of the M RS resource groups includes one or more RS resource pairs configured with an RS resource for channel measurement and an RS resource for interference measurement, wherein the CSI includes information on N (N≤M, N is the natural number) RS resource groups selected from the M RS resource groups and a L1-SINR value for the N RS resource groups.

14. A base station of transmitting channel state information (CSI) in a wireless communication system, the base station comprising:

at least one transceiver for transmitting and receiving a wireless signal; and at least one processor for controlling the at least one transceiver, wherein the at least one processor configured to:

transmit, to a terminal, configuration information related to the CSI;

transmit, to the terminal, one or more RS (reference signal) resources by a different downlink spatial domain transmission filter; and receive, from the terminal, the CSI from the terminal, wherein the configuration information includes information on M (M is a natural number) RS resource groups, wherein each of the M RS resource groups includes one or more RS resource pairs configured with an RS resource for channel measurement and an RS resource for interference measurement, wherein the CSI includes information on N (N≤M, N is the natural number) RS resource groups selected from the M RS resource groups and a L1-SINR value for the N RS resource groups.

* * * * *